United States Patent
Kwon et al.

(10) Patent No.: US 11,690,029 B2
(45) Date of Patent: Jun. 27, 2023

(54) APPARATUS AND METHOD FOR UPLINK SYNCHRONIZING IN MULTIPLE COMPONENT CARRIER SYSTEM

(71) Applicant: PANTECH CORPORATION, Seoul (KR)

(72) Inventors: Ki Bum Kwon, Seoul (KR); Jae Hyun Ahn, Seoul (KR); Kang Suk Huh, Seoul (KR)

(73) Assignee: PANTECH CORPORATION, Seoul (KR)

( * ) Notice: Subject to any disclaimer, the term of this patent is extended or adjusted under 35 U.S.C. 154(b) by 0 days.

(21) Appl. No.: 17/392,177

(22) Filed: Aug. 2, 2021

(65) Prior Publication Data

US 2021/0368464 A1 Nov. 25, 2021

Related U.S. Application Data

(63) Continuation of application No. 16/806,830, filed on Mar. 2, 2020, now Pat. No. 11,082,932, which is a continuation of application No. 16/424,258, filed on May 28, 2019, now Pat. No. 10,582,460, which is a continuation of application No. 15/997,976, filed on Jun. 5, 2018, now abandoned, which is a continuation of application No. 15/709,185, filed on Sep. 19, 2017,
(Continued)

(30) Foreign Application Priority Data

Mar. 23, 2012 (KR) .................. 10-2012-0030216

(51) Int. Cl.
*H04W 56/00* (2009.01)
*H04W 36/00* (2009.01)

(52) U.S. Cl.
CPC .... *H04W 56/0005* (2013.01); *H04W 36/0055* (2013.01); *H04W 56/00* (2013.01)

(58) Field of Classification Search
CPC ......... H04W 56/0005; H04W 36/0055; H04W 56/00
See application file for complete search history.

(56) References Cited

U.S. PATENT DOCUMENTS

2013/0188619 A1* 7/2013 Dinan ................. H04W 74/006
370/336
2015/0049739 A1* 2/2015 Lee ................... H04W 56/0045
370/336

OTHER PUBLICATIONS

"LTE; Evolved Universal Terrestrial Radio Access (E-UTRA); Radio Resource Control (RRC); Protocol specification", 3GPP TS 36.331 version 10.4.0 Release 10, Published Dec. 2011.
(Continued)

*Primary Examiner* — Duc C Ho
(74) *Attorney, Agent, or Firm* — Ladas & Parry, LLP

(57) ABSTRACT

A user equipment (UE) of re-organizing a timing advance group (TAG) is provided. The UE includes: a receiving unit for receiving, from a serving base station, secondary serving cell (SCell) configuration information which includes a first field and a second field, the first field including an ScellIndex of an SCell to indicate a removal of the SCell, the second field including at least one of the ScellIndex to indicate an addition of the SCell and a TAG ID indicating a TAG of the SCell, and a radio resource control (RRC) processing unit for performing the addition of the SCell after performing the removal of the SCell from one or more SCells configured in the UE, and for reorganizing the TAG by including the SCell in the TAG.

16 Claims, 16 Drawing Sheets

Related U.S. Application Data now Pat. No. 10,015,759, which is a continuation of application No. 15/338,993, filed on Oct. 31, 2016, now Pat. No. 9,769,776, which is a continuation of application No. 14/626,047, filed on Feb. 19, 2015, now Pat. No. 9,516,614, which is a continuation of application No. 13/849,296, filed on Mar. 22, 2013, now Pat. No. 8,964,645.

(56) References Cited

OTHER PUBLICATIONS

"Group management for multiple TA", 3GPP TSG-RAN WG2 #75, R2-114169, Aug. 22-26, 2011, Athens, Greece.
"GTA group handling", 3GPP TSG-RAN WG2 #77, R2-120218, Feb. 6-10, 2012, Dresden, Germany.

* cited by examiner

APPARATUS AND METHOD FOR UPLINK SYNCHRONIZING IN MULTIPLE COMPONENT CARRIER SYSTEM

CROSS-REFERENCE TO RELATED APPLICATIONS

This application is a continuation of U.S. patent application Ser. No. 16/806,830, filed on Mar. 2, 2020, now issued as U.S. Pat. No. 11,082,932, which is a continuation of U.S. patent application Ser. No. 16/424,258, filed on May 28, 2019, now issued as U.S. Pat. No. 10,582,460, which is a continuation of U.S. patent application Ser. No. 15/997,976, filed on Jun. 5, 2018, which is a continuation of U.S. patent application Ser. No. 15/709,185, filed on Sep. 19, 2017, now issued as U.S. Pat. No. 10,015,759 which is a continuation of U.S. patent application Ser. No. 15/338,993, filed on Oct. 31, 2016, now issued as U.S. Pat. No. 9,769,776, which is a continuation of U.S. patent application Ser. No. 14/626,047, filed on Feb. 19, 2015, now issued as U.S. Pat. No. 9,516,614, which is a continuation of U.S. patent application Ser. No. 13/849,296, filed on Mar. 22, 2013, now issued as U.S. Pat. No. 8,964,645, and claims priority from and the benefit of Korean Patent Application No. 10-2012-0030216, filed on Mar. 23, 2012, all of which are incorporated by reference for all purposes as if set forth herein.

BACKGROUND

Field

The present invention relates to wireless communication and, more particularly, to an apparatus and method for uplink synchronization in a multiple component carrier system.

Discussion of the Background

In a common wireless communication system, although an uplink bandwidth and a downlink bandwidth are differently set, only one carrier is chiefly taken into consideration. In $3^{rd}$ Generation Partnership Project (3GPP) Long Term Evolution (LTE), the number of carriers forming uplink and downlink is one based on a single carrier and the bandwidth of uplink and the bandwidth of downlink are symmetrical to each other. In this single carrier system, random access is performed using one carrier. As multiple component carrier systems are recently introduced, random access has been able to be implemented through several component carriers.

A multiple component carrier system means a wireless communication system capable of a carrier aggregation. The carrier aggregation is technology in which small fragmented bands are efficiently used, and the carrier aggregation creates an effect that uses a logically wide band by aggregating a plurality of physically continuous or discontiguous bands in a frequency domain.

A terminal performs a random access procedure in order to access a network. The random access procedure can be divided into a contention-based random access procedure and a non-contention-based random access procedure. The greatest difference between the contention-based random access procedure and the non-contention-based random access procedure lies in whether a random access preamble is dedicated to one terminal or not. An object of a terminal to perform a random access procedure on a network can include initial access, a handover, a scheduling request, and timing alignment.

In a multiple component carrier, in order to effectively perform timing alignment, a concept of a Timing Advance Group (TAG) is used. The TAG is a group of one or more serving cells having the same timing advance value and is configured in response to higher layer signaling. A base station can indicate that a secondary serving cell is included in what TAG for each secondary serving cell. For example, a base station can inform a terminal that a first secondary serving cell is included in a first TAG, a second secondary serving cell is included in a second TAG, and a third secondary serving cell is included in a first TAG, regarding the three secondary serving cells configured in the terminal.

However, a signaling protocol for informing that a secondary serving cell is included in what TAG has not yet been clearly defined. Furthermore, when a TAG to which a secondary serving cell belongs is changed according to a channel condition, whether a terminal will be informed using what method and how the method will be implemented have not yet been disclosed.

SUMMARY

An object of the present invention is to provide an apparatus and method for uplink synchronization in a multiple component carrier system.

Another object of the present invention is to provide an apparatus and method for reorganizing a TAG based on an RRC connection reconfiguration procedure.

Yet another object of the present invention is to provide an apparatus and method for reorganizing a TAG based on a random access procedure.

Yet further another object of the present invention is to provide an apparatus and method for sending TAG configuration information for reorganizing a TAG and secondary serving cell configuration information.

In accordance with an aspect of the present invention, there is provided UE for obtaining uplink synchronization in a multiple component carrier system. The UE includes a random access processing unit configured to control the transmission of a random access preamble used to obtain a timing advance value for the uplink timing synchronization of a secondary serving cell, a transmission unit configured to send the random access preamble to an eNB, a reception unit configured to receive secondary serving cell configuration information ordering the secondary serving cell to be additionally configured in the UE, from the eNB, and a Radio Resource Control (RRC) processing unit configured to reorganize a TAG that is a set of serving cells having the same timing advance value so that the secondary serving cell is included in the TAG.

In accordance with another aspect of the present invention, there is provided a method of UE obtaining uplink synchronization in a multiple component carrier system. The method includes sending a random access preamble used to obtain a timing advance value for the uplink timing synchronization of a secondary serving cell to an eNB, receiving secondary serving cell configuration information, ordering the secondary serving cell to be additionally configured in the UE, from the eNB, receiving a Random Access Response (RAR) message including a timing advance value from the eNB as a response to the random access preamble, and reorganizing a TAG that is a set of serving cells having the same timing advance value so that the secondary serving cell is included in the TAG.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
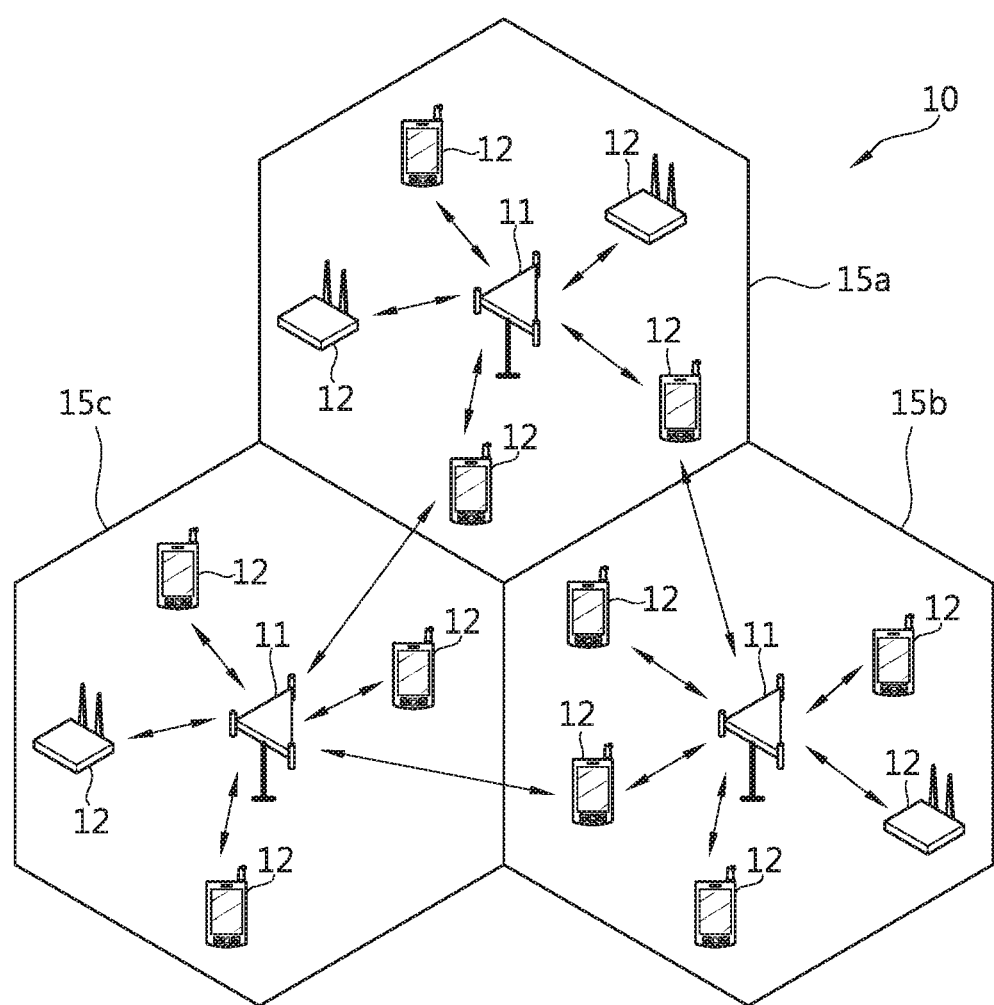
FIG. 1 shows a wireless communication system to which the present invention is applied.

Hereinafter, in this specification, the contents of the present invention will be described in detail in connection with some exemplary embodiments, with reference to the accompanying drawings. It is to be noted that in assigning reference numerals to elements in the drawings, the same reference numerals denote the same elements throughout the drawings even in cases where the elements are shown in different drawings. Furthermore, in describing the embodiments of the present invention, a detailed description of the known functions and constitutions will be omitted if it is deemed to make the gist of the present invention unnecessarily vague.

Furthermore, in this specification, a wireless communication network is described as the subject, but tasks performed in the wireless communication network can be performed in a process in which a system (e.g., a base station) managing the wireless communication network controls the wireless communication network and sends data or can be performed by a terminal that accesses the wireless communication network. In accordance with the present invention, the wireless communication system includes a communication system supporting one or more component carriers.

FIG. 1 shows a wireless communication system to which the present invention is applied.

Referring to FIG. 1, a plurality of the wireless communication systems 10 are widely deployed in order to provide a variety of communication services, such as voice and packet data. The wireless communication system 10 includes one or more Base Stations (BS) 11. The BSs 11 provide communication services to specific cells 15a, 15b, and 15c. Each of the cells may be classified into a plurality of areas (called sectors).

User Equipment (UE) 12 may be fixed or mobile and may also be called another terminology, such as a Mobile Station (MS), a Mobile Terminal (MT), a User Terminal (UT), a Subscriber Station (SS), a wireless device, a Personal Digital Assistant (PDA), a wireless modem, or a handheld device. The BS 11 may also be called another terminology, such as an evolved-NodeB (eNB), a Base Transceiver System (BTS), an access point, a femto BS, a home NodeB, or a relay. The cell should be interpreted as a comprehensive meaning that indicates some area covered by the BS 11. The cell has a meaning that covers a variety of coverage areas, such as a mega cell, a macro cell, a micro cell, a pico cell, and a femto cell.

Hereinafter, downlink refers to communication from the BS 11 to the UE 12, and uplink refers to communication from the UE 12 to the BS 11. In downlink, a transmitter may be part of the BS 11, and a receiver may be part of the UE 12. In uplink, a transmitter may be part of the UE 12, and a receiver may be part of the BS 11. Multiple access schemes applied to the wireless communication system are not limited. A variety of multiple access schemes, such as Code Division Multiple Access (CDMA), Time Division Multiple Access (TDMA), Frequency Division Multiple Access (FDMA), Orthogonal Frequency Division Multiple Access (OFDMA), Single Carrier-Frequency Division Multiple Access (SC-FDMA), OFDM-FDMA, OFDM-TDMA, and OFDM-CDMA, may be used. Uplink transmission and downlink transmission may be performed in accordance with a Time Division Duplex (TDD) scheme using different times or a Frequency Division Duplex (FDD) scheme using different frequencies.

A Carrier Aggregation (CA) supports a plurality of component carriers. The CA is also called a spectrum aggregation or a bandwidth aggregation. The CA is technology in which small fragmented bands are efficiently used. The CA can create an effect that uses a logically wide band by aggregating a plurality of physically continuous or discontiguous bands in a frequency domain. Each of carriers aggregated by a CA is called a Component Carrier (CC). Each of the CCs is defined by a bandwidth and a center frequency. A CA is introduced in order to support an increased throughput, prevent an increase of costs due to the introduction of wideband Radio Frequency (RF) devices, and guarantee compatibility with the existing systems. For example, if 5 CCs are allocated as the granularity of a carrier unit having a 20 MHz bandwidth, a maximum of a 100 MHz bandwidth can be supported.

CCs may have different sizes (i.e., bandwidths). For example, assuming that 5 CCs are used to form a 70 MHz band, a resulting configuration may be, for example, 5 MHz CC (carrier #0)+20 MHz CC (carrier #1)+20 MHz CC (carrier #2)+20 MHz CC (carrier #3)+5 MHz CC (carrier #4).

Hereinafter, a multiple component carrier system to which the present invention is applied refers to a system configured to include pieces of UE and eNBs and support a CA. In a multiple component carrier system, a contiguous CA and/or a discontiguous CA may be used and a symmetric aggregation or an asymmetric aggregation may be used. UE supporting a wireless communication system according to the present invention can support one or more carriers, that is, a CA, depending on its capabilities.

Hereinafter, a set of serving cells configured in one MS can be formed of only one primary serving cell or of one primary serving cell and one or more secondary serving cells. A primary serving cell means one serving cell which provides security inputs and NAS mobility information in an RRC establishment or re-establishment state. At least one cell can be configured to form a set of serving cells together with a primary serving cell depending on the capabilities of UE. The at least one cell is called a secondary serving cell.

Meanwhile, the CC can be divided into a Primary CC (PCC) and a Secondary CC (SCC). UE may use only one PCC or may use one or more SCCs together with a PCC. UE can receive a PCC and/or one or more SCCs allocated by an eNB.

A DL CC corresponding to a primary serving cell is called a downlink PCC (DL PCC), and an UL CC corresponding to a primary serving cell is called an uplink PCC (UL PCC). Furthermore, in downlink, a CC corresponding to a secondary serving cell is called a downlink SCC (DL SCC). In uplink, a CC corresponding to a secondary serving cell is called an uplink SCC (UL SCC). Only a DL CC may correspond to one serving cell, and both a DL CC and an UL CC may correspond to one serving cell.

Accordingly, communication between UE and an eNB performed through a DL CC or an UL CC in a carrier system has the same concept as communication between UE and an eNB performed through a serving cell.

A random access procedure can be performed in order to obtain uplink synchronization. During the random access procedure, UE obtains uplink synchronization based on a timing advance value transmitted by an eNB. The timing advance value is indicated by a Timing Advance Command (TAC) transmitted from the eNB to the UE. The timing advance value may also be called a timing alignment value. A random access preamble is used to obtain a timing advance value for the uplink timing synchronization of a secondary serving cell.

When uplink synchronization is obtained, UE starts a timing alignment timer. When the timing alignment timer operates, the UE determines that uplink synchronization has been achieved between the UE and an eNB. If the timing alignment timer expires or does not operate, the UE determines that uplink synchronization between the UE and the eNB has not been achieved and does not perform uplink transmission other than the transmission of a random access preamble.

Meanwhile, in a multiple component carrier system, one MS performs communication with an eNB through a plurality of CCs or a plurality of serving cells. If signals transmitted from UE to an eNB through a plurality of serving cells have the same time delay, the UE can obtain uplink synchronization for all the serving cells by using one timing advance value. In contrast, if the signals transmitted from the UE to the eNB through the plurality of serving cells have different time delays, different timing advance values are necessary for the respective serving cells. That is, multiple timing alignment values are necessary for the plurality of serving cells. If the UE performs random access procedures on the respective serving cells in order to obtain the multiple timing advance values, overhead is generated in limited uplink and downlink resources and the complexity of a synchronization tracking procedure for maintaining uplink synchronization can be increased because the number of random access procedures necessary to obtain uplink synchronization is increased. In order to reduce this overhead and complexity, a TAG is defined. A TAG may also be called a timing alignment group.

A TAG is a group including a serving cell(s) using the same timing advance value and the same timing reference or a timing reference cell having the same timing reference, from among serving cells for which uplink has been configured. For example, if a first serving cell and a second serving cell belong to a TAG1 and the second serving cell is a timing reference cell, the same timing advance value TA1 is applied to the first serving cell and the second serving cell, and the TA1 value is applied to the first serving cell on the basis of the downlink synchronization timing of the DL CC of the second serving cell. In contrast, if the first serving cell and the second serving cell belong to respective TAG1 and TAG2, the first serving cell and the second serving cell become timing reference cells within the respective TAG1 and TAG2, and different timing advance values TA1 and TA2 are applied to the first serving cell and the second serving cell. A TAG can include a primary serving cell, may include at least one secondary serving cell, and may include a primary serving cell and at least one secondary serving cell.

Each TAG includes at least one serving cell in which an UL CC has been configured, and information about a serving cell mapped to each TAG is called TAG configuration information. A TAG is transmitted to UE through RRC signaling when the first group configuration and group reorganization are determined by a serving eNB which has configured a corresponding serving cell.

A primary serving cell does not change a TAG. Furthermore, UE has to be able to support two or more TAGs if multiple timing advance values are necessary. For example, UE has to be able to support TAGs including a primary TAG (pTAG) including a primary serving cell and a secondary TAG (sTAG) not including a primary serving cell. Here, only one pTAG is always present, and one or more sTAGs may be present if multiple timing advance values are necessary. A maximum number of TAGs can be set to 2 or 4. Furthermore, a pTAG may always have a value of TAG ID=0 or have no value.

Figure 2:
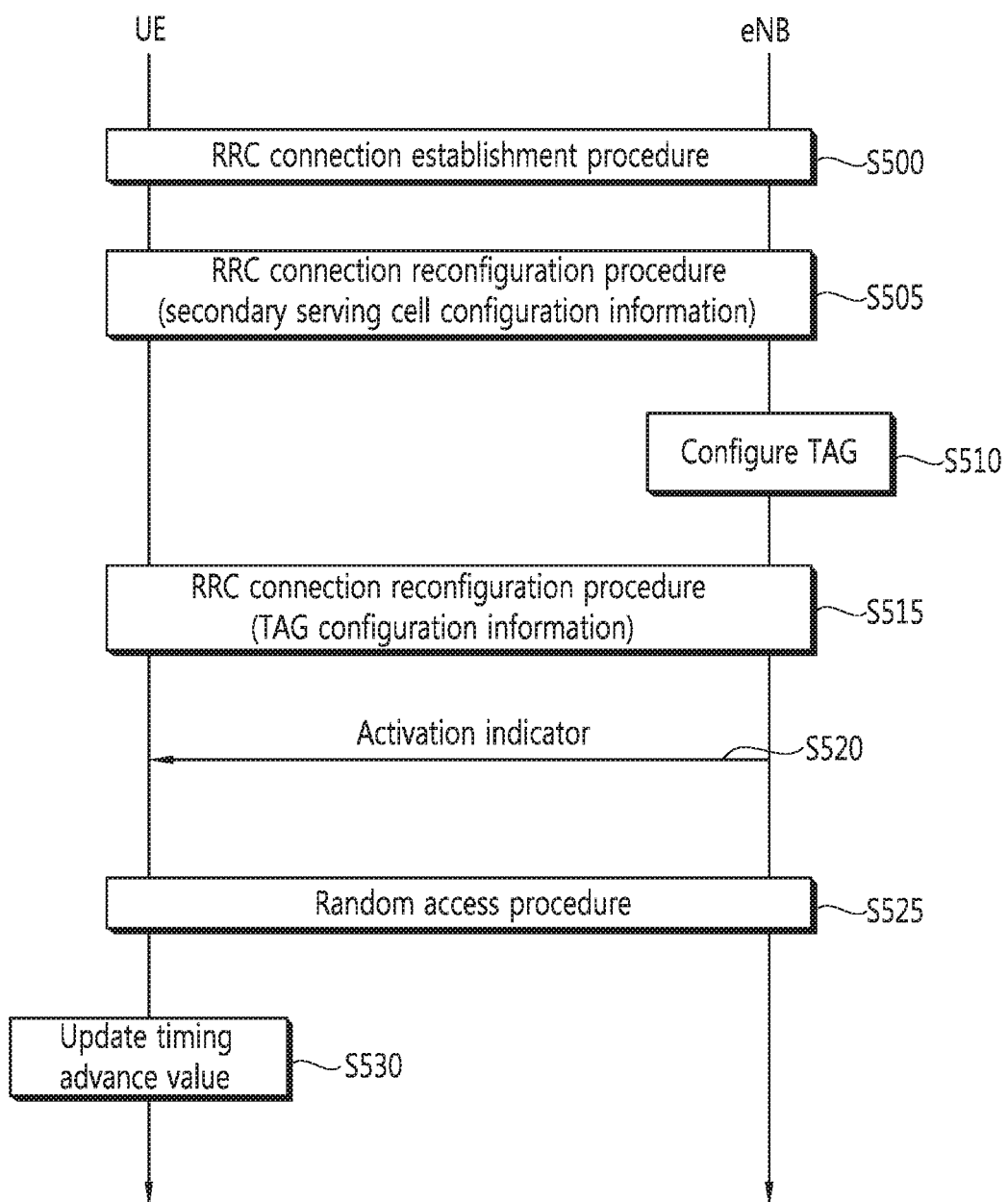
FIG. 2 is a flowchart illustrating a procedure of obtaining a multiple timing advance value in accordance with an example of the present invention.

FIG. 2 is a flowchart illustrating a procedure of obtaining a multiple timing advance value in accordance with an example of the present invention.

Referring to FIG. 2, UE and an eNB perform an RRC connection establishment procedure on the eNB through a selected cell at step S500. The selected cell becomes a primary serving cell. The RRC connection establishment procedure includes a process in which the eNB sends an RRC connection establishment message to the UE and the UE sends an RRC connection establishment-complete message to the eNB.

The eNB performs an RRC connection reconfiguration procedure for additionally configuring at least one secondary serving cell in the UE at step S505. The addition of the secondary serving cell may be performed, for example, at the request of the UE or a network or when the eNB determines to allocate more radio resources to the UE. The addition of the secondary serving cell to the UE or the release of the secondary serving cell configured in the UE can be ordered by an RRC connection reconfiguration message. The RRC connection reconfiguration procedure includes a process in which the eNB sends an RRC connection reconfiguration message to the UE and the UE sends an RRC connection re-establishment-complete message to the eNB.

The eNB configures a TAG for the serving cell configured in the UE at step S510. A TAG configuration between the serving cells may be performed in a cell-specific way according to a CA condition. For example, if the serving cell of a specific frequency band is provided through an FSR or a Remote Radio Head (RRH), the serving cell of the specific frequency band and the serving cell of a frequency band directly served by an eNB can be configured so that they always belong to different TAGs in relation to all MSs within the service coverage of the eNB.

i) If the eNB determines that the same timing advance value as that of a primary serving cell can be applied to the added secondary serving cell, the eNB configures the added 20 secondary serving cell so that it has the same TAG as the primary serving cell. In this case, a process of sending TAG configuration information, such as the step S515, may not be performed. Here, if the UE receives an activation indicator for the added secondary serving cell and uplink scheduling information without receiving TAG configuration information, the UE determines that the added secondary serving cell has been configured to have the same TAG as the primary serving cell.

ii) If the eNB determines that the same timing advance value as that of a primary serving cell cannot be applied to the added secondary serving cell, the eNB configures an sTAG including the added secondary serving cell. A TAG ID to identify each TAG is assigned to the TAG. Here, the eNB may selectively assign the TAG ID to the sTAG. For example, if the eNB confirms that the sTAG including the added secondary serving cell is different from existing configured TAGs, the eNB may assign the TAG ID to the sTAG before obtaining uplink synchronization through the random access procedure. For another example, if the eNB determines that the added secondary serving cell cannot be included in an existing configured TAG or does not know that the added secondary serving cell is included in what TAG, the eNB may not assign the TAG ID to the sTAG until it obtains uplink synchronization through the random access procedure. In this case, after the UE obtains uplink synchronization, the eNB can send TAG configuration information to the UE, and the UE can obtain the TAG ID of a corresponding sTAG.

The eNB performs an RRC connection reconfiguration procedure for sending TAG configuration information to the UE at step S515. The TAG configuration information can have a format including TAG ID information for each secondary serving cell. More particularly, uplink configuration information about each secondary serving cell can include TAG ID information. In some embodiments, the TAG configuration information can have a format for mapping a serving cell index 'ServCellIndex' assigned to each serving cell or a secondary serving cell index 'ScellIndex' assigned to only secondary serving cells. For example, a pTAG can be configured like {ServCellIndex='1', '2'}, an sTAG1 can be configured like {ServCellIndex='3', '4'} or a pTAG can be configured like {ScellIndex='1', '2'}, and an sTAG1 can be configured like {SCellIndex='3', '4'}. A primary serving cell does not have configuration information because a serving cell index is '0' and a TAG ID=0. Furthermore, if there is TAG ID information in secondary serving cells, the secondary serving cells may mean serving cells within a pTAG or may mean serving cells within an independent sTAG different from all TAGs.

TAG configuration information can further include information about a representative serving cell within each TAG. The representative serving cell is a serving cell capable of performing a random access procedure for maintaining and achieving uplink synchronization within each TAG and of being used as a timing reference cell. Unlike in the above embodiment, if TAG configuration information does not include a representative serving cell, UE by itself can select a representative serving cell within each TAG. In one embodiment, UE can select a serving cell on which a random access procedure has been most recently ordered by an eNB or on which a random access procedure has been successfully completed, from among serving cells on which random access procedures have been ordered by the eNB, as a representative serving cell. In another embodiment, UE can select a serving cell in which parameters for a random access procedure have been set when an eNB configures a secondary serving cell as a representative serving cell. If the number of serving cells complying with a condition on a representative serving cell is plural or a representative serving cell has been deactivated, UE can set a secondary serving cell having the lowest secondary serving cell index as a representative serving cell.

If the eNB determines to schedule a specific secondary serving cell, the eNB sends an activation indicator for activating the specific secondary serving cell to the UE at step S520.

If uplink synchronization is not obtained from a specific sTAG, the UE has to obtain a timing advance value to be adjusted in relation to the specific sTAG. This adjustment can be implemented by a random access procedure ordered by the eNB at step S525.

The random access procedure on the activated secondary serving cell within the sTAG can be started by a PDCCH order transmitted by the eNB. Only a secondary serving cell including a timing reference designated within an sTAG may become a secondary serving cell which can receive a PDCCH order, or all secondary serving cells in which an RACH has been configured may become the secondary serving cell which can receive a PDCCH order.

The eNB performs control so that the UE performs two or more random access procedures at the same time. The simultaneous execution of random access procedures includes a first case where two or more random access procedures are synchronized with each other and performed at the same time and a second case where two or more random access procedures are performed at the same time in some of the time when the random access procedures are performed. For example, the second case includes a case where when UE performs a random access procedure on a primary serving cell, a random access procedure is started through a secondary serving cell (i.e., a PDCCH order is received) during the time when the UE waits for a Random Access Response (RAR) message. Here, the time when the UE waits for the RAR message may include or may not include a period in which an RAR message can be determined to be retransmitted by the UE.

If the eNB determines that it has not secured information enough to map a specific secondary serving cell to a specific TAG although it uses existing information within a network and/or assistant information (e.g., location information, an RSRP, and an RSRQ) received from UE, the eNB sets the specific secondary serving cell as a new sTAG and obtains the uplink timing advance value through a random access procedure.

In response to the RAR message received from the eNB, the UE determines that the random access procedure has been successfully completed and updates the timing advance value of the secondary serving cell at step S530. The RAR message can be included in an RAR MAC Protocol Data Unit (PDU) that is included in and received from a PDSCH indicated by a PDCCH scrambled into a Random Access-Radio Network Temporary Identifier (RA-RNTI) and then transmitted or may be received in the form of a MAC Control Element (CE) within a MAC PDU that is included in and received from a PDSCH indicated by a PDCCH scrambled into a C-RNTI.

If the RAR message is received in the form of the MAC CE, the RAR message may be called an 'extended TAC MAC CE'. In this case, the RAR message can include a TA value and a TAG ID or a secondary serving cell index.

Figure 3:
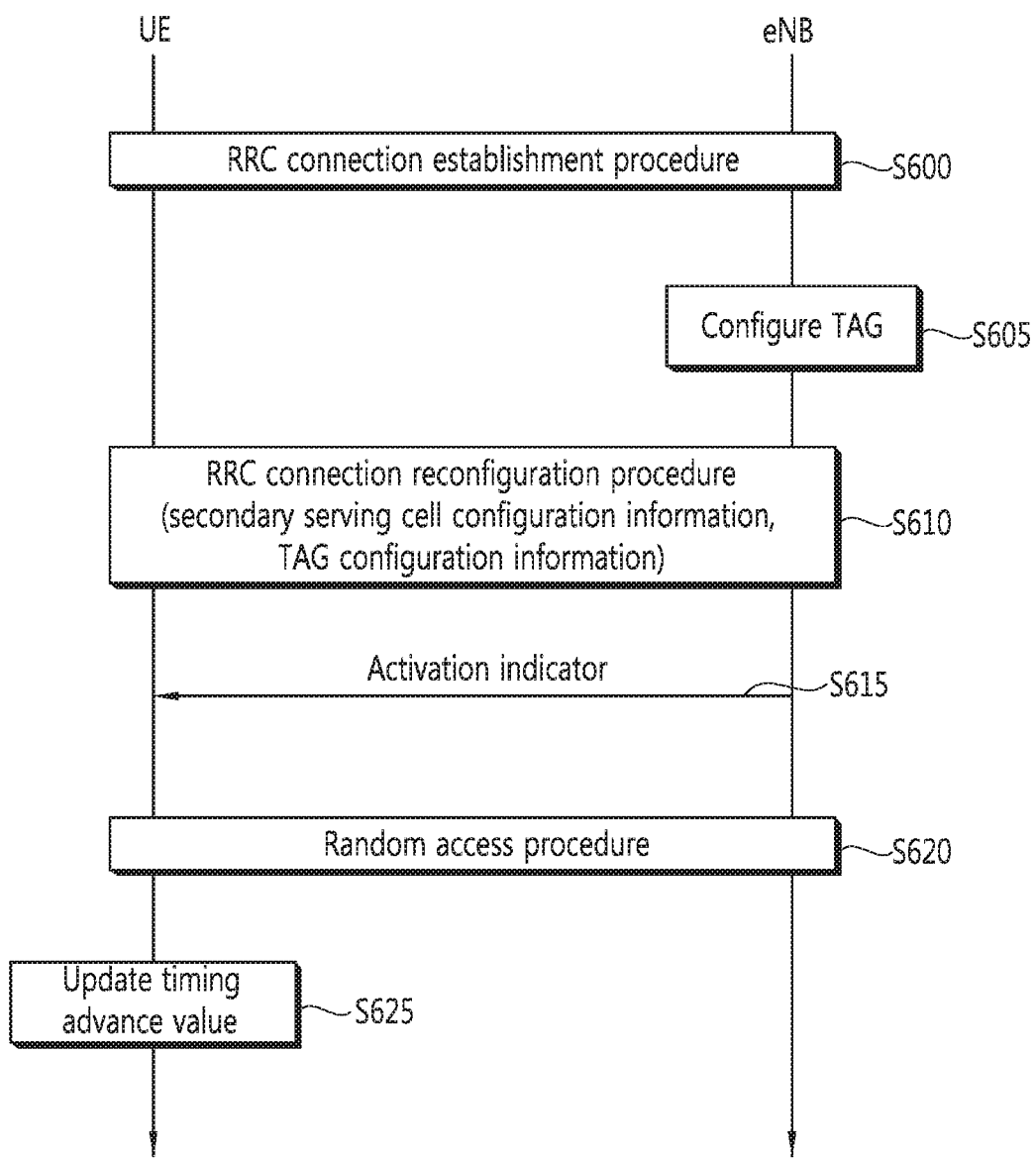
FIG. 3 shows a process of sending secondary serving cell configuration information and TAG configuration information through one RRC connection reconfiguration procedure.

The RRC connection reconfiguration procedure S505 for configuring a secondary serving cell and the procedure S515 for sending TAG configuration information for configuring a TAG are illustrated as being separately performed in FIG. 2, but this is only illustrative. Secondary serving cell configuration information and TAG configuration information may be included in one RRC connection reconfiguration message. FIG. 3 shows a process of sending secondary serving cell configuration information and TAG configuration information through one RRC connection reconfiguration procedure. The procedure of FIG. 3 differs from the procedure of FIG. 2 in that both secondary serving cell configuration information and TAG configuration information are transmitted to UE according to one RRC connection reconfiguration procedure at step S610 and the UE performs the reconfiguration of a secondary serving cell and the configuration of a TAG at once. That is, TAG configuration information is also transmitted in an RRC connection reconfiguration procedure for sending secondary serving cell configuration information.

For example, the secondary serving cell configuration information may include the TAG configuration information. For example, the secondary serving cell configuration information may be an index regarding a secondary serving cell added to UE and the identifier (ID) of a TAG to which the secondary serving cell having the index belongs. For another example, the TAG configuration information may include the secondary serving cell configuration information. For example, the TAG configuration information may include the TAG ID of each TAG configured in UE, the index of a serving cell belonging to each TAG, the index of a secondary serving cell added to a specific TAG, and TAT parameters. The TAG configuration information may not be removed although a serving cell belonging to a corresponding TAG is not present. In other words, configuration information about a specific TAG within the TAG configuration information may include only a TAG ID and TAT parameters.

An RRC connection reconfiguration message transmitted from the eNB to the UE at the step S610 may be a first RRC reconfiguration message received right after the RRC connection reconfiguration procedure has been successfully performed or may be other RRC reconfiguration messages. The remaining steps S600, S605, S615, S620, and S625 are the same as those of FIG. 2, and a detailed description thereof is omitted.

Figure 4:
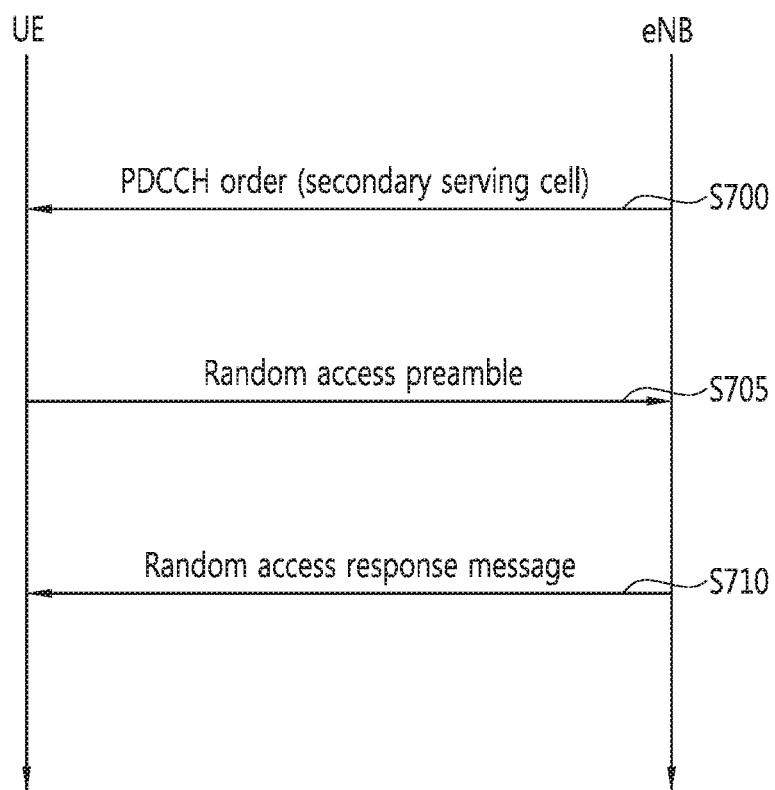
FIG. 4 is a flowchart illustrating a method of performing random access in accordance with an example of the present invention.

Referring back to FIG. 2, the random access procedure at the step S525 can be performed by, for example, a procedure of FIG. 4.

FIG. 4 is a flowchart illustrating a method of performing random access in accordance with an example of the present invention.

Referring to FIG. 4, an eNB sends a PDCCH order, ordering the start of the random access procedure regarding a secondary serving cell configured in UE, to the UE at step S700. Here, the secondary serving cell may be a secondary serving cell on which uplink synchronization is determined to be needed by the eNB.

For example, in the case of a non-contention-based random access procedure, the eNB selects one of pre-agreed dedicated random access preambles, from among all available random access preambles, and sends RA preamble assignment information including the index of the selected random access preamble and information about available time/frequency resources to the UE through the PDCCH order. This is because the eNB has to assign a dedicated random access preamble without a possible collision to the UE for the non-contention-based random access procedure.

For example, if the random access procedure is performed during a handover process, the UE can obtain a dedicated random access preamble from a handover command message. For another example, if the random access procedure is performed at the request of the eNB (i.e., in response to the PDCCH order), the UE can obtain a dedicated random access preamble through a PDCCH, that is, physical layer signaling. In this case, the physical layer signaling has a Downlink Control Information (DCI) format IA and can include fields shown in Table 1.

TABLE 1

A Carrier Indicator Field (CIF) - 0 or 3 bits.
- a flag for identifying formats 0/1A - 1 bit (indicates format 0 in the case of 0 and format 1A in the case of 1)
If format 1A CRC is scrambled into a C-RNTI and the remaining fields are set as follows, the format 1A is used for a random access procedure started by a PDCCH order.
- Below-
- A localized/distributed) VRB assignment flag − 1 bit. Set to 0.
- Resource block assignment - $\lceil \log_2(N_{RB}^{DL}(N_{RB}^{DL}+1)/2 \rceil$ bits. All bits are set to 1
- A preamble index - 6 bits
- A PRACH mask index (mask Index) - 4 bits
- All the remaining bits of the format 1A for the temporary scheduling assignment of one PDSCH codeword are set to 0.

Referring to Table 1, the preamble index is an index indicating one preamble selected from pre-agreed dedicated random access preambles for the non-contention-based random access procedure, and the PRACH mask index is information about available time/frequency resources. The information about available time/frequency resources is different depending on a Frequency Division Duplex (FDD) system and a Time Division Duplex (TDD) system as in Table 2.

TABLE 2

| PRACH MASK INDEX | PERMITTED PRACH (FDD) | PERMITTED PRACH (TDD) |
|---|---|---|
| 0 | All | All |
| 1 | PRACH RESOURCE INDEX 0 | PRACH RESOURCE INDEX 0 |
| 2 | PRACH RESOURCE INDEX 1 | PRACH RESOURCE INDEX 1 |
| 3 | PRACH RESOURCE INDEX 2 | PRACH RESOURCE INDEX 2 |
| 4 | PRACH RESOURCE INDEX 3 | PRACH RESOURCE INDEX 3 |
| 5 | PRACH RESOURCE INDEX 4 | PRACH RESOURCE INDEX 4 |
| 6 | PRACH RESOURCE INDEX 5 | PRACH RESOURCE INDEX 5 |
| 7 | PRACH RESOURCE INDEX 6 | RESERVED |
| 8 | PRACH RESOURCE INDEX 7 | RESERVED |
| 9 | PRACH RESOURCE INDEX 8 | RESERVED |
| 10 | PRACH RESOURCE INDEX 9 | RESERVED |
| 11 | All even-numbered PRACH opportunities within time domain, a first PRACH resource index wihtin a subframe | All even-numbered PRACH opportunities wihtihn time domain, a first PRACH resource index wihtin a subframe |
| 12 | All odd-numbered PRACH opportunities within time domain, a first PRACH resource index wihtin a subframe | All odd-numbered PRACH opportunities within time domain, a first PRACH resource index wihtin a subframe |
| 13 | RESERVED | a first PRACH resource index wihtin a subframe |
| 14 | RESERVED | a second PRACH resource index wihtin a subframe |
| 15 | RESERVED | a third PRACH resource index wihtin a subframe |

For another example, in the case of a contention-based random access procedure, the eNB sets a preamble index within the RA preamble assignment information to '000000' and sends the RA preamble assignment information to the UE. The UE randomly selects one of contention-based random access preambles, sets a value of the PRACH mask index to '0', and performs a contention-based procedure. Furthermore, the RA preamble assignment information can be transmitted to the UE through a higher layer message (e.g., Mobility Control Information (MCI) within a handover command), such as RRC signaling.

The UE sends a random access preamble on the secondary serving cell designated at the step S700 to the eNB at step S705. The random access preamble may be transmitted on a representative serving cell within a TAG to which the secondary serving cell belongs. A representative serving cell is a serving cell that has been selected to send the random access preamble within the TAG configured in the UE. The representative serving cell can be selected for each TAG. Furthermore, the UE may send the random access preamble on a representative serving cell within any one TAG, from among a plurality of TAGs, or may send the random access preamble on two or more representative serving cells within respective TAGs. For example, it is assumed that TAGs configured in the UE are a TAG1 and a TAG2, the TAG1={a first serving cell, a second serving cell, a third serving cell}, and the TAG2={a fourth serving cell, a fifth serving cell}. If the representative serving cell of the TAG1 is the second serving cell and the representative serving cell of the TAG2 is the fifth serving cell, the UE sends an assigned dedicated random access preamble to the eNB through the second serving cell or the fifth serving cell.

The representative serving cell may also be called a special serving cell (special SCell), a reference serving cell (reference SCell), or a timing reference serving cell (or timing reference cell).

The eNB sends an RAR message to the UE at step S710. The RAR message includes a timing advance value. When the eNB successfully receives the random access preamble, the eNB can check that what UE has sent the random access preamble through what serving cell on the basis of the received random access preamble and time/frequency resources. In particular, if UE starts a random access procedure for a secondary serving cell in response to the PDCCH order of the eNB, the UE has already secured an identifier unique to the UE, for example, a C-RNTI, from a primary serving cell. Accordingly, the eNB can send an RAR message to the UE by using the C-RNTI of the UE if necessary. Here, to use the C-RNTI includes scrambling a PDCCH, indicating a PDSCH to which the RAR message has been mapped, into the C-RNTI.

In another embodiment, the eNB may send the RAR message on the primary serving cell by using the Random Access-Radio Network Temporary Identifier (RA-RNTI) of the UE. In response to the RAR message received from the eNB, the UE determines that the random access procedure has been successfully completed.

If a secondary serving cell is added to or released from the UE, an existing TAG can be updated by the UE or the eNB. For example, it is assumed that TAGs configured in the UE are a TAG1 and a TAG2, the TAG1={a first serving cell, a second serving cell}, and the TAG2={a fourth serving cell}. If a third secondary serving cell has to be added in order to extend the bandwidth of the UE, the eNB sends secondary serving cell configuration information for adding the third secondary serving cell to the UE by using an RRC connection reconfiguration procedure. If the third secondary serving cell has the same timing advance value as the TAG1, the third secondary serving cell is enrolled in the TAG1. Here, the eNB or the UE is updated from the TAG1 into a TAG1={the first serving cell, the second serving cell, the third serving cell}, but does not change the TAG2. In contrast, if the third secondary serving cell has a different timing advance value from that of the TAG1 or the TAG2, the third secondary serving cell belongs to a new TAG3. Accordingly, the eNB or the UE configures the new TAG3={the third secondary serving cell}.

As described above, secondary serving cell configuration information and TAG configuration information have a close relationship because a change in the configuration of secondary serving cells leads to the reorganization of a TAG. The reorganization of a TAG is also related to uplink synchronization because it can result in the update of a timing advance value applied to a secondary serving cell. The reorganization of a TAG may also be called the update, change, or reconfiguration of a TAG. The reorganization of a TAG may have the same meaning as the update or change of TAG configuration information because UE or an eNB updates or changes TAG configuration information.

The reorganization of a TAG includes all cases where a TAG is newly generated and deleted if a secondary serving cell included in the TAG is changed. The reorganization of a TAG due to a change in the configuration of a secondary serving cell can include a variety of embodiments. For example, in order to reorganize a TAG, an eNB may send signaling related to the reorganization of the TAG to UE and the UE by itself can reorganize the TAG even without signaling. Furthermore, for the reorganization of a TAG, a message for an RRC connection reconfiguration procedure may be used and signaling for a random access procedure may be used. Furthermore, a message for the reorganization of a TAG can have a variety of formats. The reorganization of a TAG according to a variety of embodiments and corresponding uplink synchronization are described below. First, a procedure for reorganizing a TAG when a secondary serving cell is released is described below.

Figure 5:
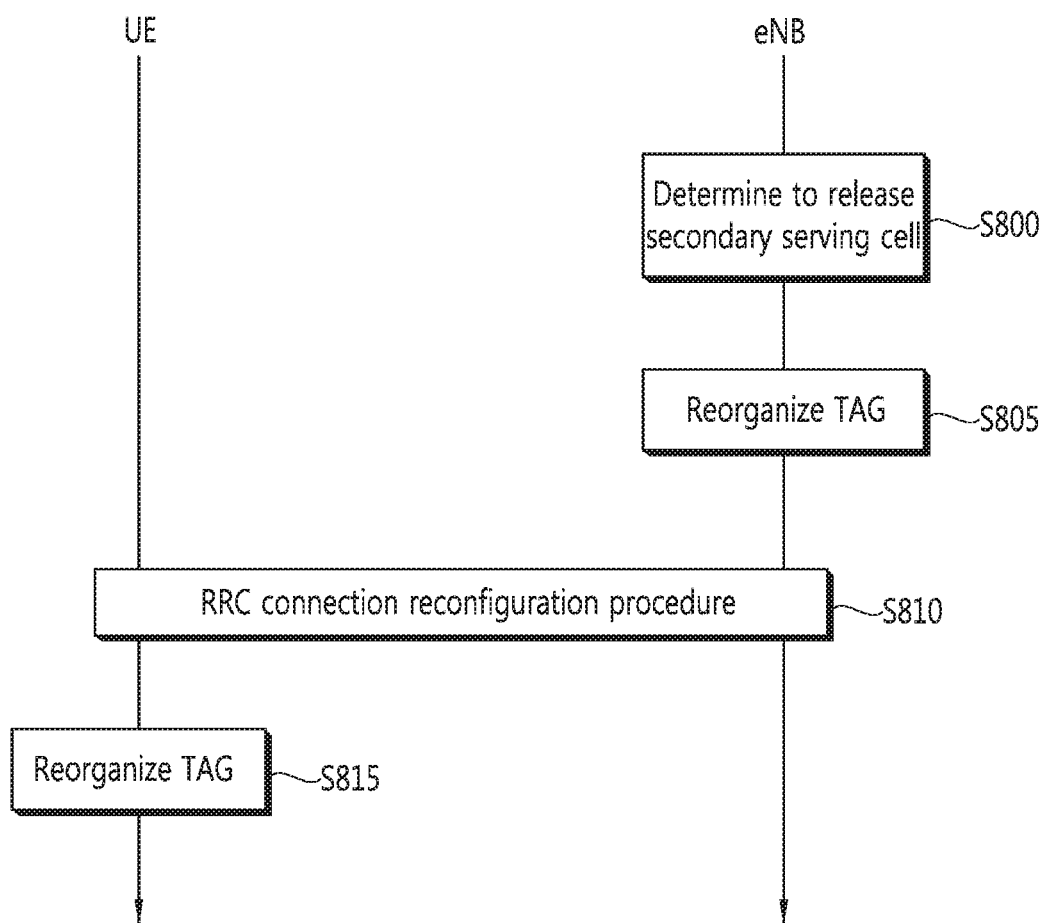
FIG. 5 is a flowchart illustrating a method of reorganizing a TAG in accordance with an example of the present invention.

(1) A Procedure for Reorganizing a TAG when a Secondary Serving Cell is Released FIG. 5 is a flowchart illustrating a method of reorganizing a TAG in accordance with an example of the present invention.

Referring to FIG. 5, an eNB determines to release a secondary serving cell configured in UE at step S800. For example, if a frequency band necessary for UE is reduced or connection to secondary serving cells configured by a serving eNB is released in a target eNB after a handover, the eNB can determine to release a secondary serving cell. If UE releases all secondary serving cells owing to the start of an RRC connection reconfiguration procedure due to a Radio Link Failure (RLF), the UE resets or removes all pieces of TAG configuration information. When the TAG configuration information is reset, TAG ID information remains intact, but a TA value within each TAG is set to '0', information about a serving cell included in each TAG is removed, and a TAT parameter is set to 'infinity'.

The eNB reorganizes a TAG at step S805. Here, the reorganization of the TAG corresponds to the update of the TAG to which the released secondary serving cell belonged. For example, if a TAG to which the secondary serving cell belonged is a TAG1={a first serving cell, a second serving cell} and the secondary serving cell to be released is the second serving cell, the eNB is updated into a TAG1={the first serving cell}.

Since the eNB has released the secondary serving cell and reorganized the TAG, the eNB has to inform the UE of the release of the secondary serving cell and the reorganization of the TAG. Here, the eNB can send only secondary serving cell configuration information, ordered the release of the secondary serving cell, to the UE. This is because the UE can update the TAG so that the secondary serving cell is released from the TAG even without additional TAG configuration information because the UE is already aware that the secondary serving cell to be released belongs to what TAG.

Accordingly, the eNB performs an RRC connection reconfiguration procedure for releasing the secondary serving cell at step S810. For example, in the RRC connection reconfiguration procedure at the step S810, the secondary serving cell configuration information for releasing the secondary serving cell and information about the configuration of the reorganized TAG (hereinafter abbreviated to 'reorganized TAG configuration information') may be included in different RRC connection reconfiguration messages as in FIG. 2. In this case, the RRC connection reconfiguration procedure is performed twice. Here, the sequence of the step S805 may be performed in the RRC connection reconfiguration procedure for sending the reorganized TAG configuration information at the step S810.

For another example, in the RRC connection reconfiguration procedure at the step S810, the secondary serving cell configuration information and the reorganized TAG configuration information may be included in the same RRC connection reconfiguration message as in FIG. 3. In this case, the RRC connection reconfiguration procedure is performed once. That is, the reorganized TAG configuration information is also transmitted in the existing RRC connection reconfiguration procedure for sending the secondary serving cell configuration information. Here, the reorganized TAG configuration information may be included in the secondary serving cell configuration information and transmitted or may be transmitted through an additional field different from that of the secondary serving cell configuration information. If the reorganized TAG configuration information is transmitted through an additional field, the reorganized TAG configuration information may be represented by, for example, a pTAG={1, 3} and an sTAG[TAG ID=1]={2, 4}. Here, the pTAG={1, 3} means a primary serving cell and serving cells in which a secondary serving cell1 and a secondary serving cell3 form the pTAG.

For yet another example, the RRC connection reconfiguration procedure at the step S810 may not include the reorganized TAG configuration information. This means that configuration information does not include TAG configuration information.

The secondary serving cell configuration information for releasing the secondary serving cell is sCellToReleaseList and can be defined as in the following table.

TABLE 3

| RRCConnectionReconfiguration IEs ::= SEQUENCE { | |
|---|---|
| sCellToReleaseList | SCellToReleaseList |
| OPTIONAL, -- Need ON | |
| sCellToAddModList | SCellToAddModList |
| OPTIONAL, -- Need ON | |

TABLE 3-continued

| nonCriticalExtension | SEQUENCE { } OPTIONAL -- Need OP |
|---|---|
| } | |
| SCellToReleaseList ::= | SEQUENCE (SIZE (1..max.SCell)) OF SCellIndex |

Referring to Table 3, the RRC connection reconfiguration message 'RRCConnectionReconfiguration IEs' include sCellToReleaseList, that is, the secondary serving cell configuration information for releasing the secondary serving cell. The size of sCellToReleaseList can be set to 1 to a maximum number of secondary serving cells 'maxScell, and sCellToReleaseList indicates the index of a secondary serving cell 'SCellIndex' to be released.

If the RRC connection reconfiguration message including the secondary serving cell configuration information for releasing the secondary serving cell is received, the UE releases the secondary serving cell from a TAG to which the secondary serving cell to be released belongs and reorganizes the TAG at step S815. The UE can perform the reorganization of the TAG even without TAG configuration information. In this aspect, the RRC connection reconfiguration message at the step S810 has a function of releasing a secondary serving cell and also ordering a TAG to be reorganized. If a pTAG and an sTAG are configured in the UE and the secondary serving cell of the sTAG is released when one secondary serving cell is included in the sTAG, the TAG ID of the sTAG is also removed due to the reorganization of the TAG. In contrast, if only a pTAG is configured in the UE, the reorganization of a TAG including the removal of the pTAG is not performed because although a secondary serving cell is released from the pTAG because the pTAG necessarily includes a primary serving cell. As described above, the reorganization of the TAG can be performed when both a pTAG and an sTAG are configured in the UE.

As described above, a procedure can be simplified and a TAG can be reorganized more rapidly because TAG configuration information for the reorganization of the TAG does not need to be separately transmitted.

A procedure for reorganizing a TAG when a secondary serving cell is added is described below.

(2) A Procedure for Reorganizing a TAG when a Secondary Serving Cell is Added is Described Below In releasing a secondary serving cell, UE and an eNB do not need to further maintain uplink synchronization with a secondary serving cell to be released. Accordingly, a timing advance value is also not necessary. In adding a secondary serving cell, however, an eNB or UE has to reorganize a TAG to which the added secondary serving cell belongs and know the timing advance value of the added secondary serving cell for the reorganization.

The timing advance value of the added secondary serving cell can be basically obtained on the basis of a random access procedure. If the added secondary serving cell can be mapped to an already defined TAG, a random access procedure for obtaining the timing advance value does not need to be performed. Here, the case where the added secondary serving cell can be mapped to the already defined TAG can include a case where the added secondary serving cell has the same timing advance value as the already defined TAG. Furthermore, the case where the added secondary serving cell can be mapped to the already defined TAG may include a case where an eNB is already aware of the timing advance value of the added secondary serving cell.

If the eNB is already aware of the timing advance value of the added secondary serving cell, the eNB can be aware that the added secondary serving cell has to be reorganized in what TAG. That is, the eNB can determine a TAG. For example, it is assumed that a TAG1 and a TAG2 are configured in UE, the timing advance value of the TAG1 is TA1, and the timing advance value of the TAG2 is TA2. If an eNB is aware that an added secondary serving cell has the timing advance value=TA2, the eNB reorganizes the added secondary serving cell into the TAG2. If the eNB is aware that the added secondary serving cell has a timing advance value=TA3, the eNB reorganizes the added secondary serving cell into a new TAG3.

In contrast, if an eNB is not aware of the timing advance value of an added secondary serving cell, the eNB cannot determine a TAG. In this case, the eNB can set the TAG ID of the added secondary serving cell by default. The TAG ID set by default may also be called a temporary TAG ID. Subsequently, the eNB can reorganize the added secondary serving cell into a specific TAG. That is, in the contents of reorganized TAG configuration information, the reorganized TAG configuration information can include a definite TAG ID or a temporary TAG ID. The temporary TAG ID is set to a default value. Here, the default value can be, for example, 0, and the temporary TAG ID may not have any value.

A method in which an eNB informs UE of information about the configuration of a TAG reorganized by the addition of a secondary serving cell can be implemented by using a variety of embodiments. For example, in a method of sending TAG configuration information, an eNB can send secondary serving cell configuration information, ordering the addition of a 10 secondary serving cell, and reorganized TAG configuration information to UE through an RRC connection reconfiguration procedure. Here, the secondary serving cell configuration information and the TAG configuration information may be transmitted through one RRC connection reconfiguration procedure or may be transmitted through different RRC connection reconfiguration procedures.

A case where an eNB does not need an additional random access procedure in order to map an added secondary serving cell to a TAG is first described below.

Figure 6:
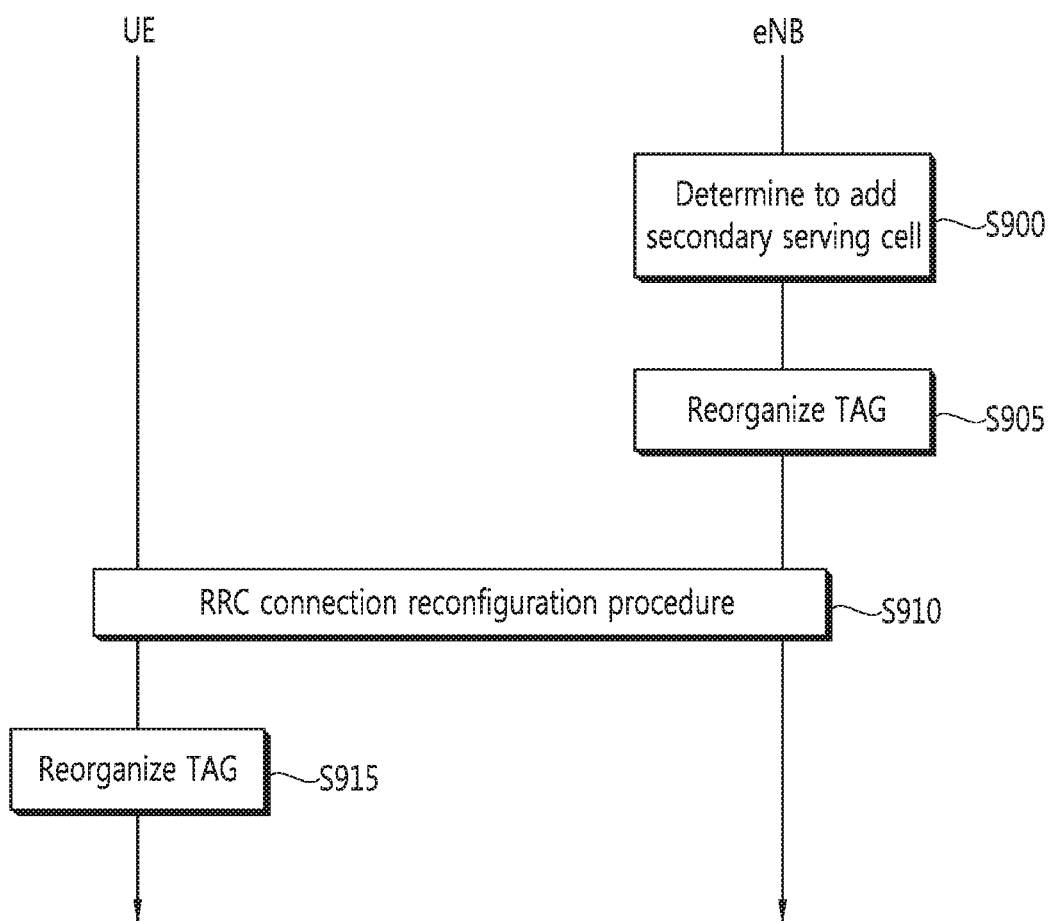
FIG. 6 is a flowchart illustrating a method of reorganizing a TAG in accordance with another example of the present invention.

(2-1) When a Random Access Procedure is not Necessary in Order to Reorganize a TAG FIG. 6 is a flowchart illustrating a method of reorganizing a TAG in accordance with another example of the present invention.

Referring to FIG. 6, an eNB determines to add a secondary serving cell at step S900. For example, if a bandwidth supported for UE is increased or the new cell of a target eNB is accessed due to a handover, the eNB can determine to add the secondary serving cell. The reorganization of a TAG due to the addition of the secondary serving cell can include two cases. In the first case, an existing TAG configured in the UE remains intact, and the secondary serving cell is added to an existing pTAG or any one of sTAGs. In the second case, a new TAG is configured in addition to a TAG already configured in the UE, and the secondary serving cell is added to the new TAG. In either case, the added secondary serving cell needs to be mapped to the TAG. Furthermore, the eNB does not perform an additional random access procedure because it is aware of the timing advance value of the added secondary serving cell. That is, the eNB can directly reorganize a TAG and send reorganized TAG configuration information without an additional random access procedure.

The eNB reorganizes a TAG in response to the added secondary serving cell at step S905. The reorganization of the TAG includes adding the secondary serving cell to an existing TAG or configuring a new TAG including the added secondary serving cell.

an additional field different from that of the secondary serving cell configuration information. If the reorganized TAG configuration information is transmitted through an additional field, the reorganized TAG configuration information may be represented by, for example, a pTAG={1, 3} and an sTAG[TAG ID=1]={2, 4}.

The reorganized TAG configuration information includes information for assigning the added secondary serving cell to a new TAG ID or assigning the added secondary serving cell to an existing TAG ID. The secondary serving cell configuration information for releasing the secondary serving cell is sCellToAddModList and can be defined as in the following table.

TABLE 4

```
RRCConnectionReconfiguration IEs ::= SEQUENCE {
        sCellToReleaseList                    SCellToReleaseList
                OPTIONAL, -- Need ON
        sCellToAddModList                     SCellToAddModList
                OPTIONAL, -- Need ON
        nonCriticalExtension                  SEQUENCE { }
                        OPTIONAL -- Need OP
}
SCellToAddModList ::=        SEQUENCE (SIZE (1..maxSCell)) OF
SCellToAddMod
SCellToAddMod ::=            SEQUENCE {
        sCellIndex                                    SCellIndex,
        cellIdentification                    SEQUENCE {
                physCellId                                    PhysCellId,
                dl-CarrierFreq                                ARFCN-ValueEUTRA
        }
                                              OPTIONAL, -- Cond
SCellAdd
        radioResourceConfigCommonSCell RadioResourceConfigCommonSCell
                                              OPTIONAL, -- Cond
SCellAdd
        radioResourceConfigDedicatedSCell
        RadioResourceConfigDedicatedSCell    OPTIONAL, -- Cond
SCellAdd2
        ...
}
```

The eNB performs an RRC connection reconfiguration procedure for adding the secondary serving cell at step S910. For example, in the RRC connection reconfiguration procedure at the step S910, the secondary serving cell configuration information for adding the secondary serving cell and the reorganized TAG configuration information may be included in different RRC connection reconfiguration messages (refer to the steps S505 and S515) as in FIG. 2. In this case, the RRC connection reconfiguration procedure is performed twice. Here, the sequence of the step S905 may be performed in the RRC connection reconfiguration procedure for sending the reorganized TAG configuration information at the step S910. Meanwhile, the reorganized TAG configuration information may be represented by, for example, a pTAG={1, 3} and an sTAG[TAG ID=1]={2, 4}.

For another example, in the RRC connection reconfiguration procedure at the step S910, the secondary serving cell configuration information for adding the secondary serving cell and the reorganized TAG configuration information may be included in the same RRC connection reconfiguration message as in FIG. 3. In this case, the RRC connection reconfiguration procedure is performed once. That is, in the existing RRC connection reconfiguration procedure for sending the secondary serving cell configuration information, the TAG configuration information is also transmitted. Here, the reorganized TAG configuration information may be included in the secondary serving cell configuration information and transmitted or may be transmitted through Referring to Table 4, the RRC connection reconfiguration message 'RRCConnectionReconfiguration IEs' includes sCellToAddModList and SCellToAddMod, that is, pieces of secondary serving cell configuration information for adding a secondary serving cell. The size of sCellToAddModList can be set to 1 to a maximum number of secondary serving cells 'maxScell', and sCellToAddModList indicates the index of the secondary serving cell to be added 'SCellIndex'. SCellToAddMod includes the index of an added secondary serving cell 'sCellIndex'. SCellToAddMod can further include a TAG ID regarding the added secondary serving cell.

When the RRC connection reconfiguration message including the secondary serving cell configuration information for adding the secondary serving cell is received, the UE reorganizes the TAG at step S915. The UE reorganizes the TAG based on the TAG configuration information included in the secondary serving cell configuration information.

A case where an eNB needs an additional random access procedure in order to map an added secondary serving cell to a TAG is described below. This case corresponds to a case where the eNB is not aware of the timing advance value of the added secondary serving cell.

(2-2) When a Random Access Procedure is Necessary to Reorganize a TAG

An eNB can obtain a timing advance value regarding an added secondary serving cell by performing a random access procedure in order to reorganize a TAG. Before obtaining the timing advance value, the eNB has to configure the added secondary serving cell in UE and perform an RRC connection reconfiguration procedure for reorganizing the TAG. Meanwhile, when reorganizing the TAG, the eNB may not be aware that the added secondary serving cell belongs to what TAG or may not assign another TAG ID to the UE because a maximum number of TAG IDs have already been assigned to the UE. In this case, how a TAG regarding the added secondary serving cell will be defined becomes ambiguous. Accordingly, there is a need for a criterion for determining the contents of reorganized TAG configuration information. For example, the eNB may define a temporary TAG ID and map the added secondary serving cell to the temporary TAG ID. In this case, reorganized TAG configuration information includes the temporary TAG ID. For example, the eNB can determine a TAG ID having the lowest index, from among the remaining TAG IDs other than the IDs of TAGs now configured in the UE, as the temporary TAG ID. For another example, the eNB may determine a specific one of the remaining TAG IDs other than the IDs of TAGs now configured in the UE as the temporary TAG ID.

For another example, the eNB may not define an additional TAG ID for the added secondary serving cell. In this case, the reorganized TAG configuration information may include a TAG ID set to 'Null', or the reorganized TAG configuration information is not transmitted.

A case where the reorganized TAG configuration information includes the temporary TAG ID is described below.

(2-2-1) A Case where Reorganized TAG Configuration Information Includes a Temporary TAG ID The present embodiment includes a first embodiment in which TAG configuration information is defined in an additional field different from that of secondary serving cell configuration information and a second embodiment in which TAG configuration information is included in secondary serving cell configuration information. The first embodiment is first described below.

Figure 7:
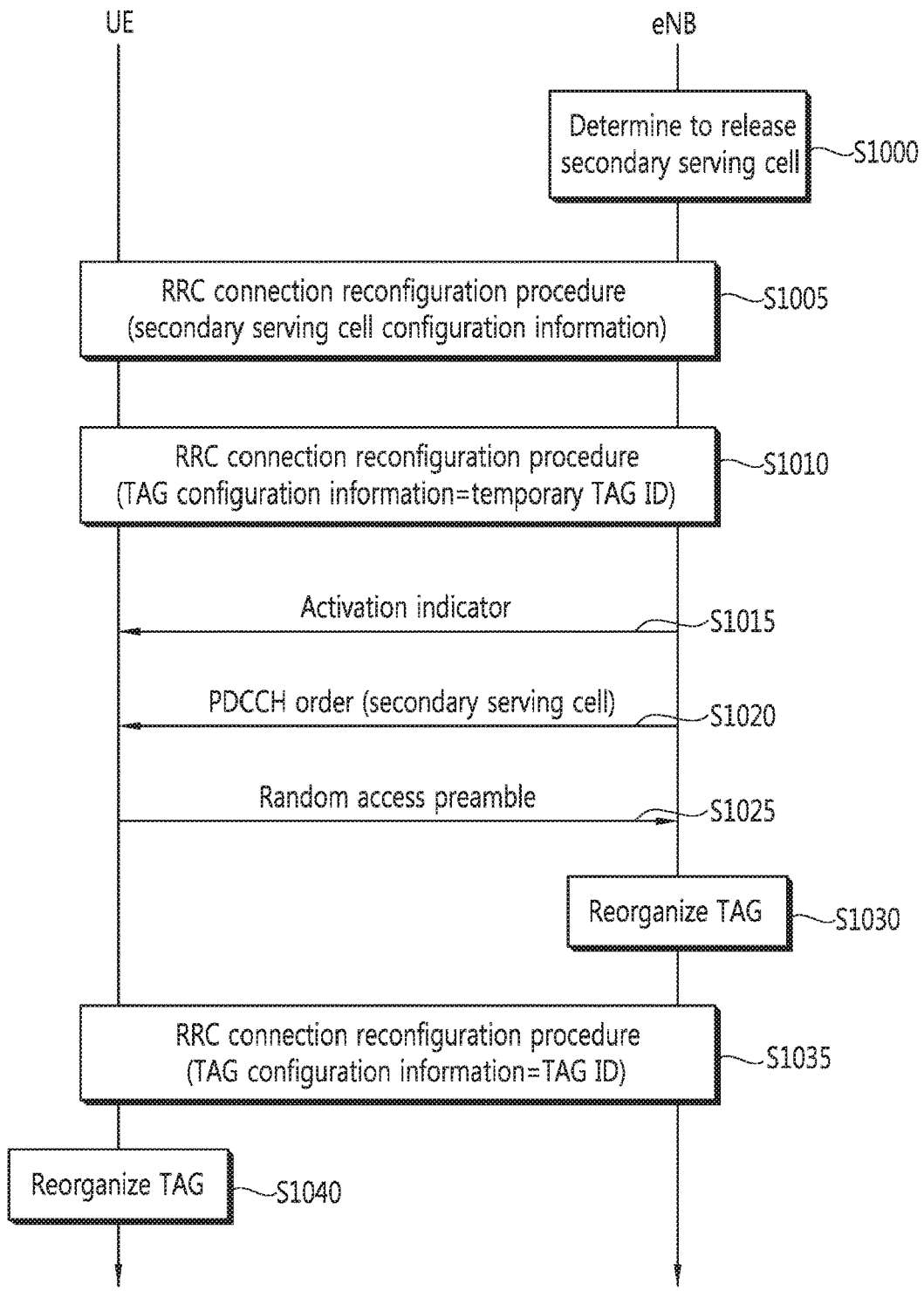
FIG. 7 is a flowchart illustrating a method of reorganizing a TAG in accordance with yet another example of the present invention.

FIG. 7 is a flowchart illustrating a method of reorganizing a TAG in accordance with yet another example of the present invention.

Referring to FIG. 7, an eNB determines to add a secondary serving cell at step S1000. For example, if a bandwidth supported for UE is increased or the new cell of a target eNB is accessed due to a handover, the eNB can determine to add the secondary serving cell.

The eNB and the UE first perform an RRC connection reconfiguration procedure for adding the secondary serving cell at step S1005. An RRC connection reconfiguration message at the step S1005 includes secondary serving cell configuration information. Next, the eNB and the UE perform an RRC connection reconfiguration procedure for reorganizing a TAG at step S1010. An RRC connection reconfiguration message at the step S1010 includes TAG configuration information. Furthermore, the TAG configuration information indicates a temporary TAG ID.

If the eNB tries to schedule the added secondary serving cell, the eNB sends an activation indicator for activating the added secondary serving cell to the UE at step S1015.

The UE has to obtain a timing advance value to be adjusted in relation to the added secondary serving cell because it has not achieved uplink synchronization regarding the added secondary serving cell. This can be implemented by a random access procedure ordered by the eNB.

The eNB sends a PDCCH order, ordering the start of the random access procedure regarding the secondary serving cell additionally configured in the UE, to the UE at step S1020.

The UE sends a random access preamble to the eNB on the added secondary serving cell at step S1025. The random access procedures at the steps S1020 and S1025 can be performed as in FIG. 4.

The eNB can obtain a timing advance value regarding the added secondary serving cell through the random access procedure and performs TAG reorganization for mapping the added secondary serving cell to a specific TAG based on the timing advance value at step S1030.

The eNB performs an RRC connection reconfiguration procedure for reorganizing the existing TAG at step S1035. The RRC connection reconfiguration procedure for reorganizing the TAG includes a process in which the eNB sends an RRC connection reconfiguration message, including the reorganized TAG configuration information, to the UE and the UE sends an RRC connection re-establishment-complete message to the eNB after the TAG is reorganized.

In accordance with a common random access procedure, the eNB has to send an RAR message in response to the random access preamble. However, the random access procedures at the steps S1025 and S1030 are additionally used to map the added secondary serving cell to the TAG and reorganize the TAG. Accordingly, a step of sending the RAR message may be omitted, and the RRC connection reconfiguration message for reorganizing the TAG can order the TAG to be reorganized and also mean the success or stop of the random access procedure. The present embodiment, however, may include a step of sending an RAR message. In this case, the step S1035 can be performed after the eNB sends the RAR message to the UE.

When receiving the RRC connection reconfiguration message for reorganizing the TAG during the random access procedure, the UE determines that the random access procedure has been successful or that the random access procedure has been stopped by an order of the eNB and terminates the random access procedure. Next, the UE reorganizes the TAG based on the reorganized TAG configuration information at step S1040. For example, the UE maps the secondary serving cell to which the temporary TAG ID has been assigned to a TAG having an ID assigned based on the reorganized TAG configuration information. Here, the TAG having the assigned ID may be a pTAG or an sTAG already configured in the UE or may be a new sTAG.

The second embodiment in which the TAG configuration information is included in the secondary serving cell configuration information is described below.

Figure 8:
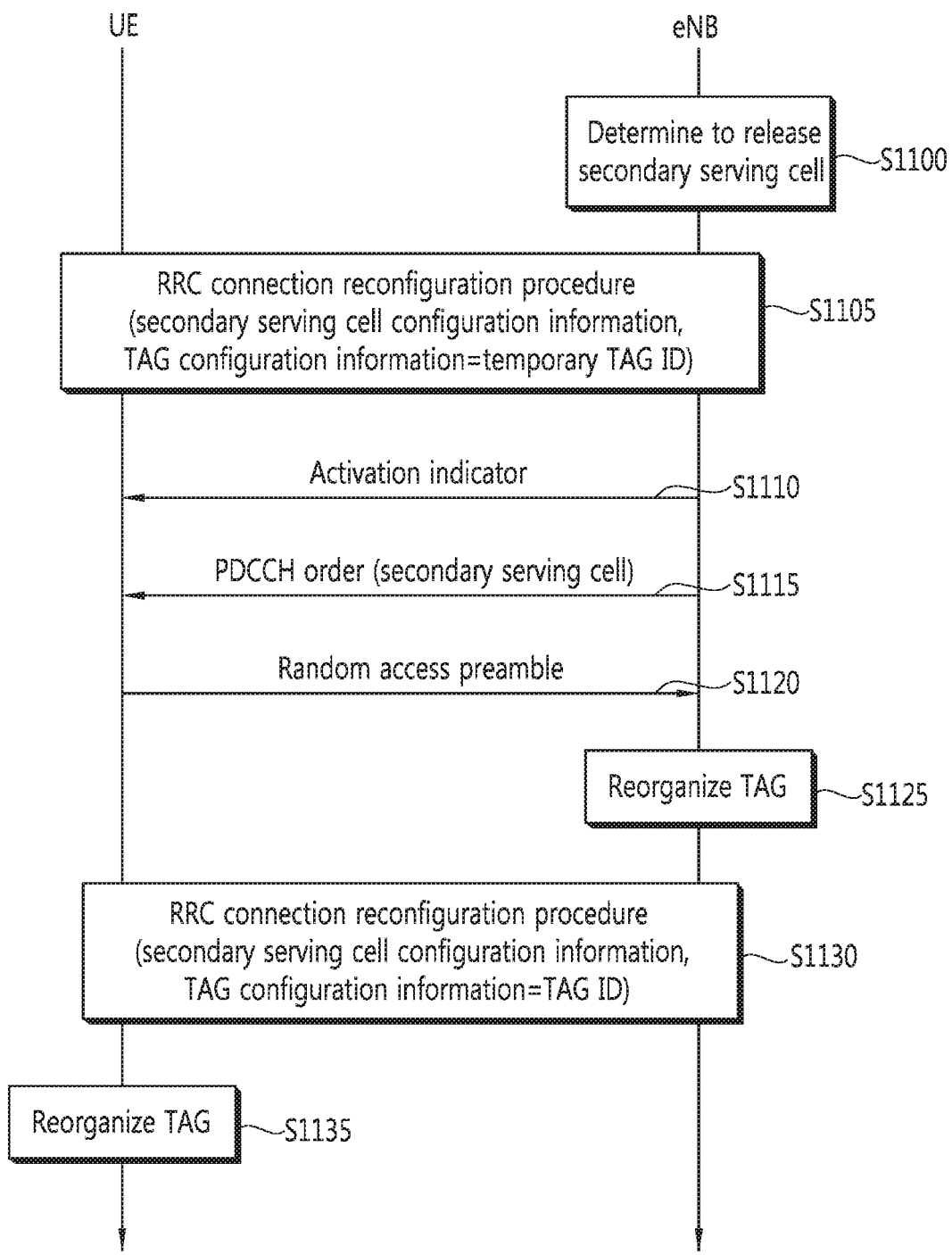
FIG. 8 is a flowchart illustrating a method of reorganizing a TAG in accordance with still yet another example of the present invention.

FIG. 8 is a flowchart illustrating a method of reorganizing a TAG in accordance with still yet another example of the present invention.

Referring to FIG. 8, an eNB determines to add a secondary serving cell at step S1100. For example, if a bandwidth supported for UE is increased or the new cell of a target eNB is accessed due to a handover, the eNB can determine to add the secondary serving cell.

The eNB and the UE first perform an RRC connection reconfiguration procedure for adding the secondary serving cell and reorganizing a TAG at step S1105. An RRC connection reconfiguration message at the step S1105 includes secondary serving cell configuration information, and the secondary serving cell configuration information includes TAG configuration information. Furthermore, the TAG configuration information indicates a temporary TAG ID.

If the eNB tries to schedule the added secondary serving cell, the eNB sends an activation indicator for activating the added secondary serving cell to the UE at step S1110.

The UE has to obtain a timing advance value to be adjusted in relation to the added secondary serving cell because it has not achieved uplink synchronization regarding the added secondary serving cell. This can be implemented by a random access procedure ordered by the eNB.

The eNB sends a PDCCH order, ordering the start of the random access procedure regarding the secondary serving cell additionally configured in the UE, to the UE at step S1115.

The UE sends a random access preamble to the eNB on the added secondary serving cell at step S1120. The random access procedures at the steps S1115 and S1120 can be performed as in FIG. 4.

The eNB can obtain a timing advance value regarding the added secondary serving cell through the random access procedure and performs TAG reorganization for mapping the added secondary serving cell to a specific TAG based on the timing advance value at step S1125.

The eNB performs an RRC connection reconfiguration procedure for the change of the secondary serving cell and the reorganization of the TAG at step S1130. The RRC connection reconfiguration procedure for the change of the secondary serving cell and the reorganization of the TAG includes a process in which the eNB sends an RRC connection reconfiguration message to the UE and the UE sends an RRC connection re-establishment-complete message to the eNB after reorganizing the TAG. Here, the RRC connection reconfiguration message includes secondary serving cell configuration information on which the eNB orders the secondary serving cell to be changed, and the secondary serving cell configuration information includes reorganized TAG configuration information.

In accordance with a common random access procedure, the eNB has to send an RAR message in response to the random access preamble. However, the random access procedures at the steps S1120 and S1125 are additionally used to map the added secondary serving cell to the TAG and reorganize the TAG. Accordingly, a step of sending the RAR message may be omitted, and the RRC connection reconfiguration message for reorganizing the TAG can order the TAG to be reorganized and also mean the success or stop of the random access procedure. The present embodiment, however, may include a step of sending an RAR message. In this case, the step S1130 can be performed after the eNB sends the RAR message to the UE.

In response to the RRC connection reconfiguration message received during the random access procedure, the UE determines that the random access procedure is successful or that the random access procedure has been stopped by an order of the eNB and terminates the random access procedure. Next, the UE reorganizes the TAG based on the reorganized TAG configuration information at step S1135. For example, the UE maps the secondary serving cell to which the temporary TAG ID has been assigned to a TAG having an ID assigned based on the reorganized TAG configuration information. Here, the TAG of the assigned ID may be a pTAG or an sTAG already configured in the UE or may be a new sTAG.

FIGS. 7 and 8 illustrate embodiments in which an eNB directly informs UE of the reorganization of a TAG by using an RRC connection reconfiguration procedure. In accordance with another embodiment, however, the eNB may inform the UE of a timing advance value through an RAR message because a random access procedure is already in progress. In this case, the UE is not directly informed of reorganized TAG configuration information, but the UE by itself can reorganize a TAG based on the timing advance value. In this sense, it can be seen that the eNB implicitly informs the UE of the reorganized TAG configuration information.

Figure 9:
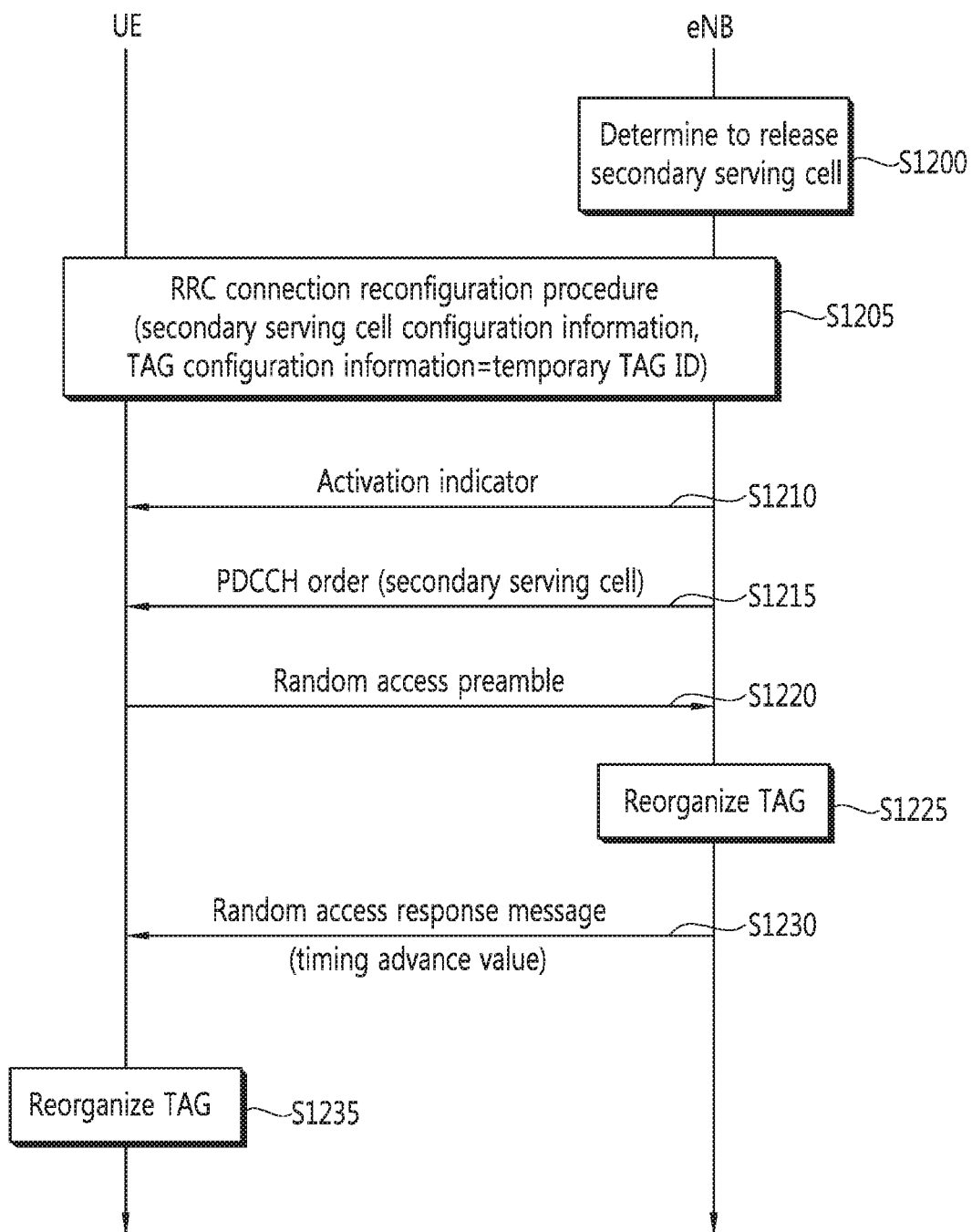
FIG. 9 is a flowchart illustrating a method of reorganizing a TAG in accordance with further yet another example of the present invention.

FIG. 9 is a flowchart illustrating a method of reorganizing a TAG in accordance with further yet another example of the present invention.

Steps S1200 to S1225 of FIG. 9 are the same as the steps S1100 to S1125 of FIG. 8, and thus a detailed description thereof is omitted.

An eNB calculates a timing advance value regarding an added secondary serving cell when receiving a random access preamble and sends an RAR message indicative of the timing advance value to UE at step S1230. Here, the RAR message is a MAC message, and the timing advance value may be indicated by a field within a MAC Random Access Response (RAR). In this case, the RAR message is mapped to a PDSCH indicated by a PDCCH that is scrambled into a Random Access (RA)-Radio Network Temporary Identifier (RNTI) for identifying the UE in a random access procedure and is then transmitted. The PDCCH scrambled into the RA-RNTI is transmitted on a primary serving cell which provides a common search space.

In an embodiment, the RAR message may be indicated by a MAC Control Element (CE). The field indicative of the timing advance value is called a Timing Advance Command (TAC) field. In this case, the RAR message is mapped to a PDSCH indicated by a PDCCH scrambled into a Cell (C)-RNTI for identifying the UE in a UE-specific space and then transmitted. The PDCCH scrambled into the C-RNTI can be transmitted on a secondary serving cell which provides a UE-specific search space.

In response to the RAR message, the UE performs TAG reorganization at step S1235. As an example of the TAG reorganization, if there is a TAG having the same timing advance value as that of an existing TAG (a pTAG or an sTAG), the UE maps the added secondary serving cell to the corresponding TAG.

As another example of the TAG reorganization, if the timing advance value is different from a timing advance value applied to an existing TAG (a pTAG or an sTAG) and the number of TAGs now configured in the UE is smaller than a maximum number of TAGs that can be configured, the UE designates a temporary TAG ID as the TAG ID of a new sTAG and maps an additional secondary serving cell to the TAG.

As yet another example of the TAG reorganization, if the timing advance value is different from a timing advance value applied to an existing TAG (a pTAG or an sTAG) and the number of TAGs now configured in the UE is the same as a maximum number of TAGs that can be configured, the UE can perform one of the following operations. i) The UE may determine that the timing advance value for the added secondary serving cell is not valid and disregard the received timing advance value. ii) The UE may deactivate the added secondary serving cell in order to prevent uplink transmission within a corresponding TAG. This is because may be a problem in uplink transmission within the TAG because a new TAG ID and the configuration of a current TAG are not valid. iii) The UE may release the configuration of the added secondary serving cell instead of the deactivation operation.

A case where reorganized TAG configuration information is not transmitted is described below.

(2-2-2) when Reorganized TAG Configuration Information is not Transmitted

The meaning that reorganized TAG configuration information is not transmitted may be i) a TAG ID=0 or ii) a TAG ID='Null' or iii) may be that TAG configuration information is not included in secondary serving cell configuration information. In the case of i), an added secondary serving cell is mapped to the pTAG by default because the ID of a pTAG is basically 0. In the case of ii) and iii), an added secondary serving cell may be mapped to a pTAG by default or may not have been mapped to any TAG. Some embodiments are described below assuming that an added secondary serving cell is mapped to a pTAG by default when TAG configuration information is not transmitted. It is however to be noted that each of the embodiments may be likewise applied to a case where an added secondary serving cell is assumed not to be mapped to any TAG.

The present embodiment includes a first embodiment in which TAG configuration information is defined by secondary serving cell configuration information and an additional field and a second embodiment in which TAG configuration information is included in secondary serving cell configuration information. The first embodiment is first described below.

Figure 10:
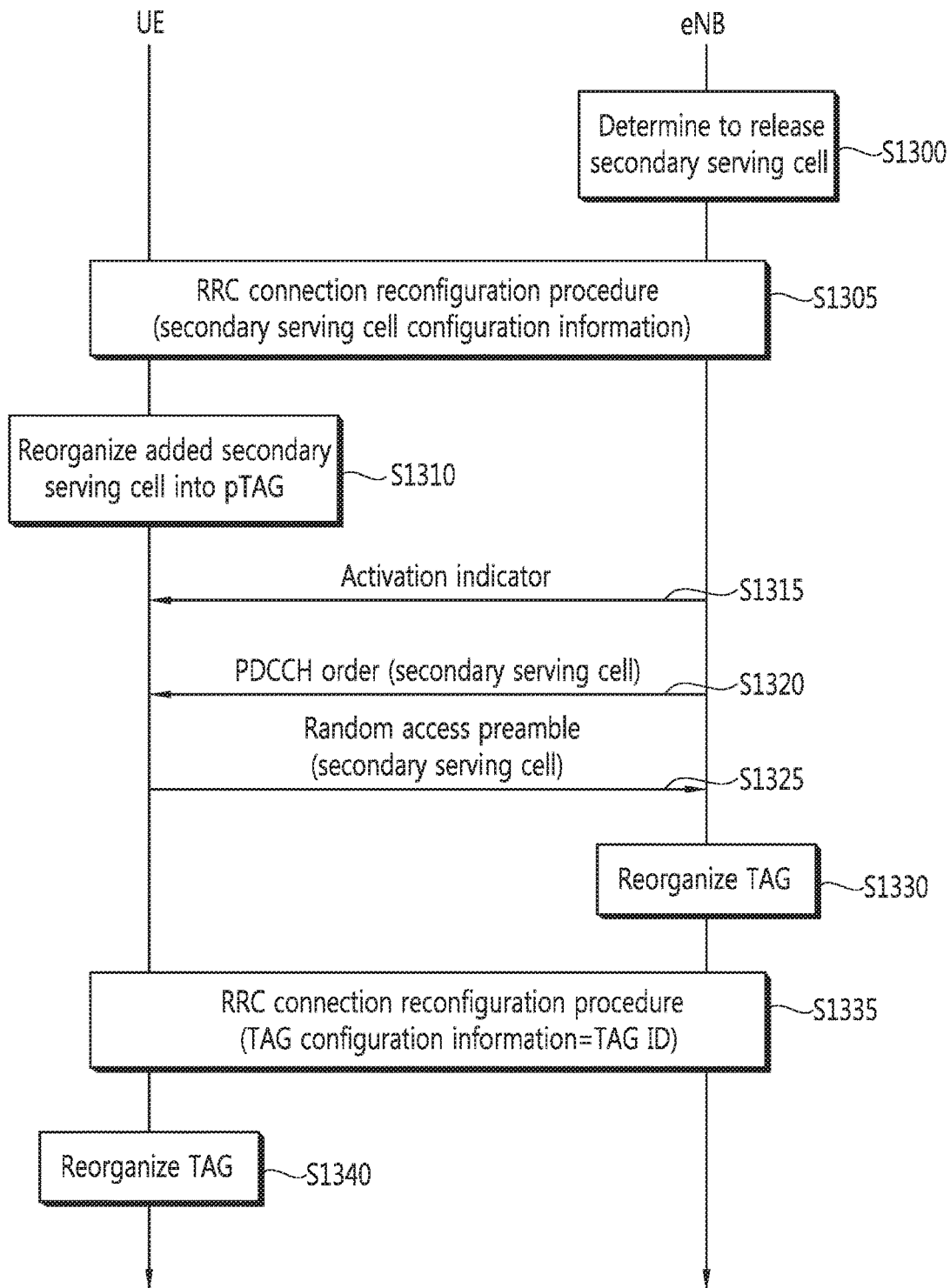
FIG. 10 is a flowchart illustrating a method of reorganizing a TAG in accordance with further yet another example of the present invention.

FIG. 10 is a flowchart illustrating a method of reorganizing a TAG in accordance with further yet another example of the present invention.

Referring to FIG. 10, an eNB determines to add a secondary serving cell at step S1300. For example, if a bandwidth supported for UE is increased or the new cell of a target eNB is accessed due to a handover, the eNB can determine to add the secondary serving cell.

The eNB and the UE first perform an RRC connection reconfiguration procedure for adding the secondary serving cell at step S1305. An RRC connection reconfiguration message at the step S1305 includes secondary serving cell configuration information. The eNB and the UE do not perform an RRC connection reconfiguration procedure for reorganizing a TAG. That is, the reorganized TAG configuration information is not transmitted.

The UE reorganizes the added secondary serving cell into a pTAG at step S1310. That is, the added secondary serving cell is mapped to the pTAG by default.

If the eNB tries to schedule the added secondary serving cell, the eNB sends an activation indicator for activating the added secondary serving cell to the UE at step S1315.

The UE has to obtain a timing advance value to be adjusted in relation to the added secondary serving cell because it has not achieved uplink synchronization regarding the added secondary serving cell. This can be implemented by a random access procedure ordered by the eNB.

The eNB sends a PDCCH order, ordering the start of the random access procedure regarding the secondary serving cell additionally configured in the UE, to the UE at step S1320.

The UE sends a random access preamble to the eNB on the added secondary serving cell at step S1325. The added secondary serving cell has belonged to the pTAG by default. In the pTAG, only a primary serving cell is a representative serving cell which sends the random access preamble. However, since the added secondary serving cell is a new secondary serving cell and the newest timing advance value can be obtained, the UE is permitted to send the random access preamble on the added secondary serving cell. The random access procedures at the steps S1320 and S1325 can be performed as in FIG. 4.

The eNB can obtain the timing advance value regarding the added secondary serving cell through the random access procedure and performs TAG reorganization for mapping the added secondary serving cell to a specific TAG based on the timing advance value at step S1330.

The eNB performs an RRC connection reconfiguration procedure for reorganizing the TAG at step S1335. The RRC connection reconfiguration procedure for the reorganization of the TAG includes a process in which the eNB sends an RRC connection reconfiguration message, including reorganized TAG configuration information, to the UE and the UE sends an RRC connection re-establishment-complete message to the eNB after reorganizing the TAG.

In accordance with a common random access procedure, the eNB has to send an RAR message in response to the random access preamble. However, the random access procedures at the steps S1325 and S1330 are additionally used to map the added secondary serving cell to the TAG and reorganize the TAG. Accordingly, a step of sending the RAR message may be omitted, and the RRC connection reconfiguration message for reorganizing the TAG can order the TAG to be reorganized and also mean the success or stop of the random access procedure. The present embodiment, however, may include a step of sending an RAR message. In this case, the step S1335 can be performed after the eNB sends the RAR message to the UE.

When receiving the RRC connection reconfiguration message for reorganizing the TAG during the random access procedure, the UE determines that the random access procedure is successful or that the random access procedure has been stopped by an order of the eNB and terminates the random access procedure. Next, the UE reorganizes the TAG based on the reorganized TAG configuration information at step S1340. For example, the UE maps the secondary serving cell to which the temporary TAG ID has been assigned to a TAG having an ID assigned based on the reorganized TAG configuration information. Here, the TAG of the assigned ID may be a pTAG or an sTAG already configured in the UE or may be a new sTAG.

The second embodiment in which TAG configuration information is included in secondary serving cell configuration information is described below.

Figure 11:
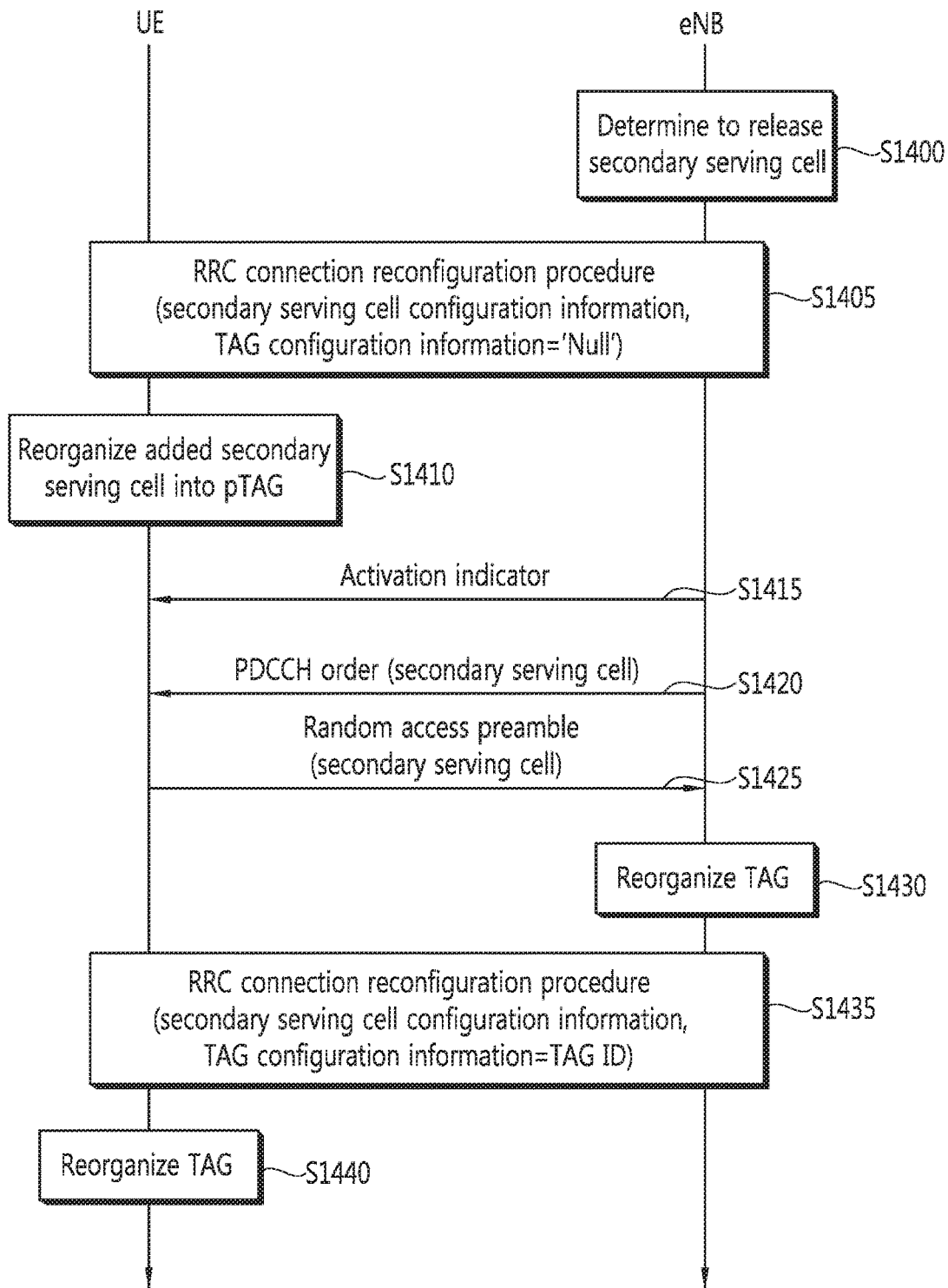
FIG. 11 is a flowchart illustrating a method of reorganizing a TAG in accordance with further yet another example of the present invention.

FIG. 11 is a flowchart illustrating a method of reorganizing a TAG in accordance with further yet another example of the present invention.

Referring to FIG. 11, an eNB determines to add a secondary serving cell at step S1400. For example, if a bandwidth supported for UE is increased or the new cell of a target eNB is accessed due to a handover, the eNB can determine to add the secondary serving cell.

The eNB and the UE first perform an RRC connection reconfiguration procedure for adding the secondary serving cell and reorganizing a TAG at step S1405. An RRC connection reconfiguration message at the step S1405 includes secondary serving cell configuration information, and the secondary serving cell configuration information includes TAG configuration information. Furthermore, the TAG configuration information includes a TAG ID set to 'Null'.

The UE reorganizes the added secondary serving cell into a pTAG at step S1410. That is, the added secondary serving cell is mapped to the pTAG by default.

If the eNB tries to schedule the added secondary serving cell, the eNB sends an activation indicator for activating the added secondary serving cell to the UE at step S1415.

The UE has to obtain a timing advance value to be adjusted in relation to the added secondary serving cell because it has not achieved uplink synchronization regarding the added secondary serving cell. This can be implemented by a random access procedure ordered by the eNB.

The eNB sends a PDCCH order, ordering the start of the random access procedure regarding the secondary serving cell additionally configured in the UE, to the UE at step S1420.

The UE sends a random access preamble to the eNB on the added secondary serving cell at step S1425. The added secondary serving cell has belonged to the pTAG by default. In the pTAG, only a primary serving cell is a representative serving cell which sends the random access preamble. However, since the added secondary serving cell is a new secondary serving cell and the newest timing advance value can be obtained, the UE is permitted to send the random access preamble on the added secondary serving cell. The random access procedures at the steps S1420 and S1425 can be performed as in FIG. 4.

The eNB can obtain a timing advance value regarding the added secondary serving cell through the random access procedure and performs TAG reorganization for mapping the added secondary serving cell to a specific TAG based on the timing advance value at step S1430.

The eNB performs an RRC connection reconfiguration procedure for changing the secondary serving cell and reorganizing the TAG at step S1435. The RRC connection reconfiguration procedure for the change of the secondary serving cell and the reorganization of the TAG includes a process in which the eNB sends an RRC connection reconfiguration message to the UE and the UE sends an RRC connection re-establishment-complete message to the eNB after reorganizing the TAG. Here, the RRC connection reconfiguration message includes secondary serving cell configuration information on which the eNB orders the secondary serving cell to be changed, and the secondary serving cell configuration information includes reorganized TAG configuration information.

In accordance with a common random access procedure, the eNB has to send an RAR message in response to the random access preamble. However, the random access procedures at the steps S1420 and S1425 are additionally used to map the added secondary serving cell to the TAG and reorganize the TAG. Accordingly, a step of sending the RAR message may be omitted, and the RRC connection reconfiguration message for reorganizing the TAG can order the TAG to be reorganized and also mean the success or stop of the random access procedure. The present embodiment, however, may include a step of sending an RAR message. In this case, the step S1435 can be performed after the eNB sends the RAR message to the UE.

In response to the RRC connection reconfiguration message received during the random access procedure, the UE determines that the random access procedure is successful or that the random access procedure has been stopped by an order of the eNB and terminates the random access procedure. Next, the UE reorganizes the TAG based on the reorganized TAG configuration information at step S1440. For example, the UE maps the secondary serving cell to which the temporary TAG ID has been assigned to a TAG having an ID assigned based on the reorganized TAG configuration information. Here, the TAG of the assigned ID may be a pTAG or an sTAG already configured in the UE or may be a new sTAG.

FIGS. 10 and 11 illustrate embodiments in which an eNB directly informs UE of the reorganization of a TAG by using an RRC connection reconfiguration procedure. In accordance with another embodiment, however, the eNB may inform the UE of a timing advance value through an RAR message because a random access procedure is already in progress. In this case, the UE is not directly informed of reorganized TAG configuration information, but the UE by itself can reorganize a TAG based on the timing advance value. In this sense, it can be seen that the eNB implicitly informs the UE of the reorganized TAG configuration information.

Figure 12:
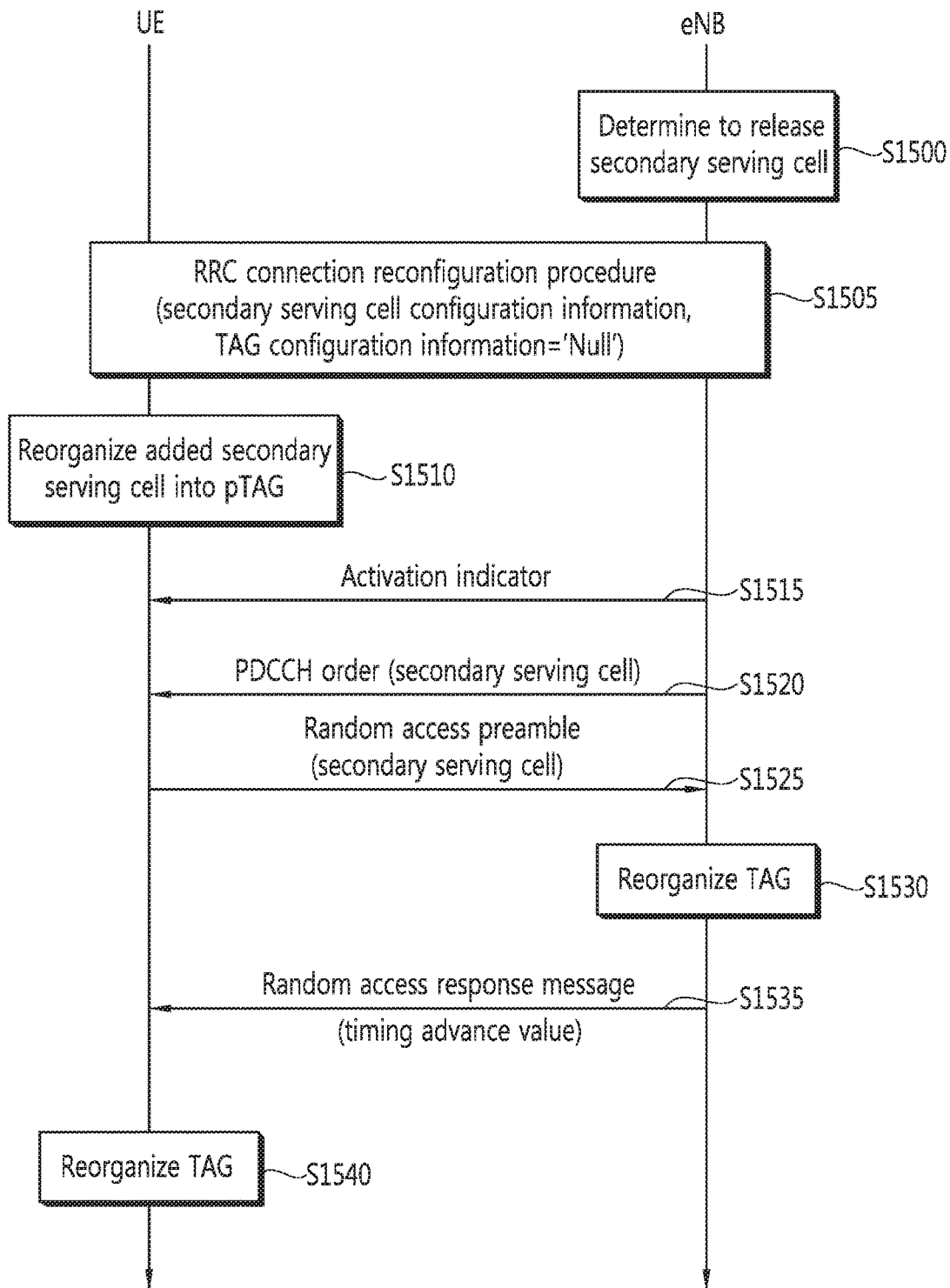
FIG. 12 is a flowchart illustrating a method of reorganizing a TAG in accordance with further yet another example of the present invention.

FIG. 12 is a flowchart illustrating a method of reorganizing a TAG in accordance with further yet another example of the present invention.

Steps S1500 to S1530 of FIG. 12 are the same as the steps S1400 to S1430 of FIG. 11, and thus a detailed description thereof is omitted.

An eNB calculates a timing advance value regarding an added secondary serving cell when receiving a random access preamble and sends an RAR message indicative of the timing advance value to UE at step S1535. Here, the RAR message is a MAC message, and the timing advance value may be indicated by a field within a MAC Random Access Response (RAR). In this case, the RAR message is mapped to a PDSCH indicated by a PDCCH that is scrambled into a Random Access (RA)-Radio Network Temporary Identifier (RNTI) for identifying the UE in a random access procedure and is then transmitted. The PDCCH scrambled into the RA-RNTI is transmitted on a primary serving cell which provides a common search space.

In an embodiment, the RAR message may be indicated by a MAC Control Element (CE). The field indicative of the timing advance value is called a Timing Advance Command (TAC) field. In this case, the RAR message is mapped to a PDSCH indicated by a PDCCH scrambled into a Cell (C)-RNTI for identifying the UE in a UE-specific space and then transmitted. The PDCCH scrambled into the C-RNTI can be transmitted on a secondary serving cell which provides a UE-specific search space.

In response to the RAR message, the UE checks the timing advance value and performs TAG reorganization at step S1540. If a PDCCH scrambled into an RA-RNTI is received, the UE checks a Random Access Preamble ID (RAPID) within the subheader of an RAR MAC PDU and checks a timing advance value from a MAC RAR indicated by the subheader. If a PDCCH scrambled into a C-RNTI is received, the UE checks a TAC MAC CE extended from the subheader of the MAC PDU or a value of an indicator (LCID) corresponding to the TAC MAC CE and checks a timing advance value from the MAC CE indicated by the subheader.

As an example of the TAG reorganization, if there is a TAG having the same timing advance value as that of an existing TAG (a pTAG or an sTAG), the UE maps the added secondary serving cell to the corresponding TAG.

As another example of the TAG reorganization, if the timing advance value is different from a timing advance value applied to an existing TAG (a pTAG or an sTAG), the UE reorganizes the added secondary serving cell into a new TAG. Furthermore, a TAG ID having the smallest value, from among TAG IDs not used as a TAG ID in the UE, may be set as the TAG ID of the new TAG, or a specific one of TAG IDs not used as a TAG ID in the UE may be set as the TAG ID of the new TAG. For example, if a pTAG (TAG ID=0) and an sTAG (TAG ID=2) are configured in the UE, the TAG ID of the new TAG becomes 1. If a pTAG (TAG ID=0) and an sTAG (TAG ID=1) are configured in the UE, the TAG ID of the new TAG becomes 2.

FIGS. 10 to 12 illustrate embodiments in which an added secondary serving cell is reorganized into an sTAG not a pTAG. If the reorganization of a TAG is not necessary because it is determined that the added secondary serving cell should be reorganized into the pTAG after an eNB checks a timing advance value, however, there is a need for a method of the eNB informing UE of this process.

Figure 13:
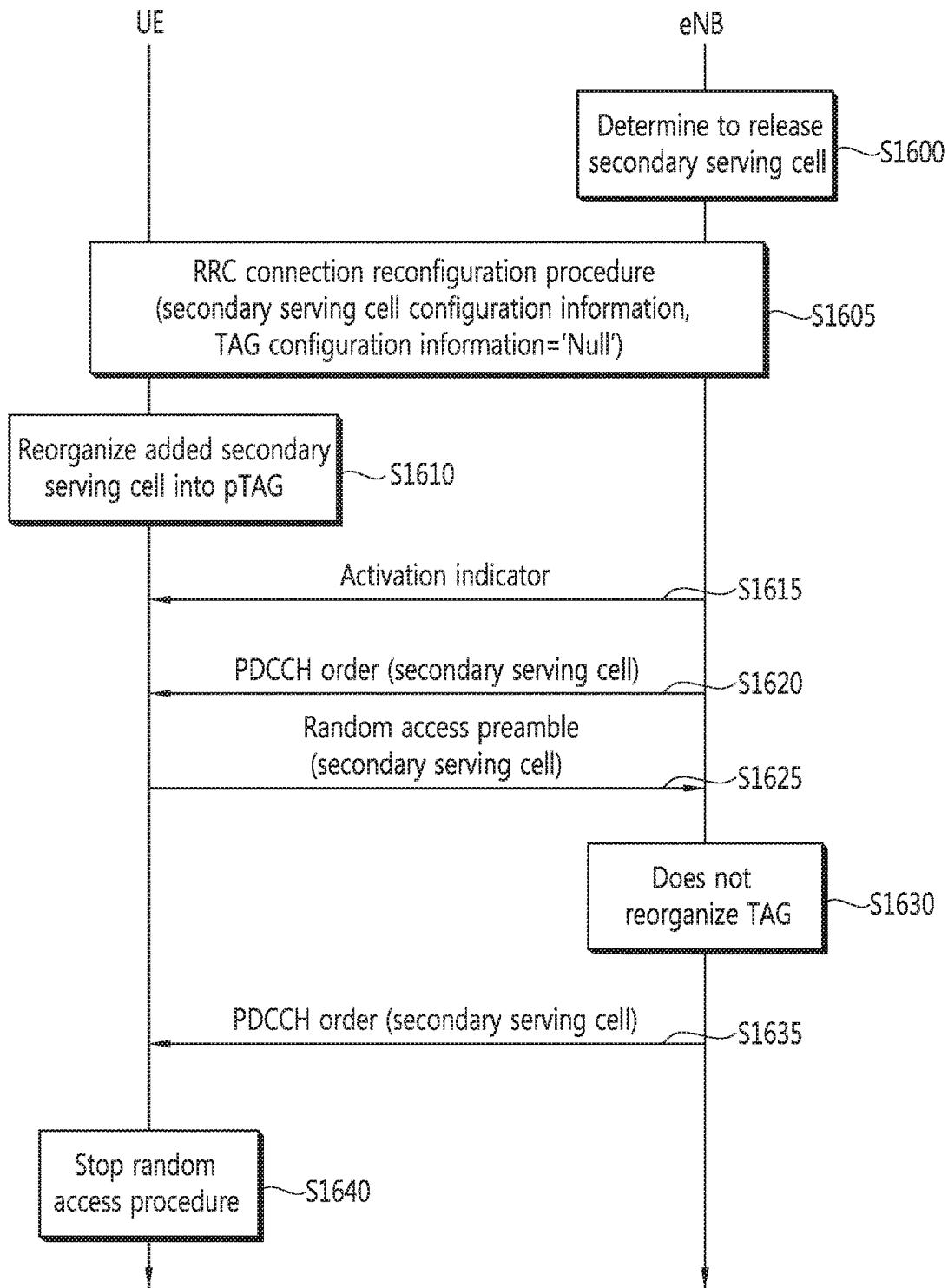
FIG. 13 is a flowchart illustrating a method of reorganizing a TAG in accordance with further yet another example of the present invention.

FIG. 13 is a flowchart illustrating a method of reorganizing a TAG in accordance with further yet another example of the present invention.

Steps S1600 to S1625 of FIG. 13 are the same as the steps S1500 to S1525 of FIG. 12, and thus a detailed description thereof is omitted.

An eNB can obtain a timing advance value regarding an added secondary serving cell through a random access procedure. If it is correct that the added secondary serving cell is mapped to a pTAG based on the timing advance value, the eNB determines to not perform TAG reorganization at step S1630.

Next, the eNB sends a PDCCH order to UE at step S1635. Here, the PDCCH order may mean that a current TAG reorganization has been determined. In an embodiment, the PDCCH order may mean the stop of an ongoing random access procedure.

If the PDCCH order for the secondary serving cell is received during a random access procedure on an added secondary serving cell within a pTAG, UE stops the ongoing random access procedure at step S1640. Here, the ongoing random access procedure is stopped only when parameters within a PDCCH order recognized as the stop of a random access procedure are the same as parameters within a PDCCH order received by the added secondary serving cell for the ongoing random access procedure.

Figure 14:
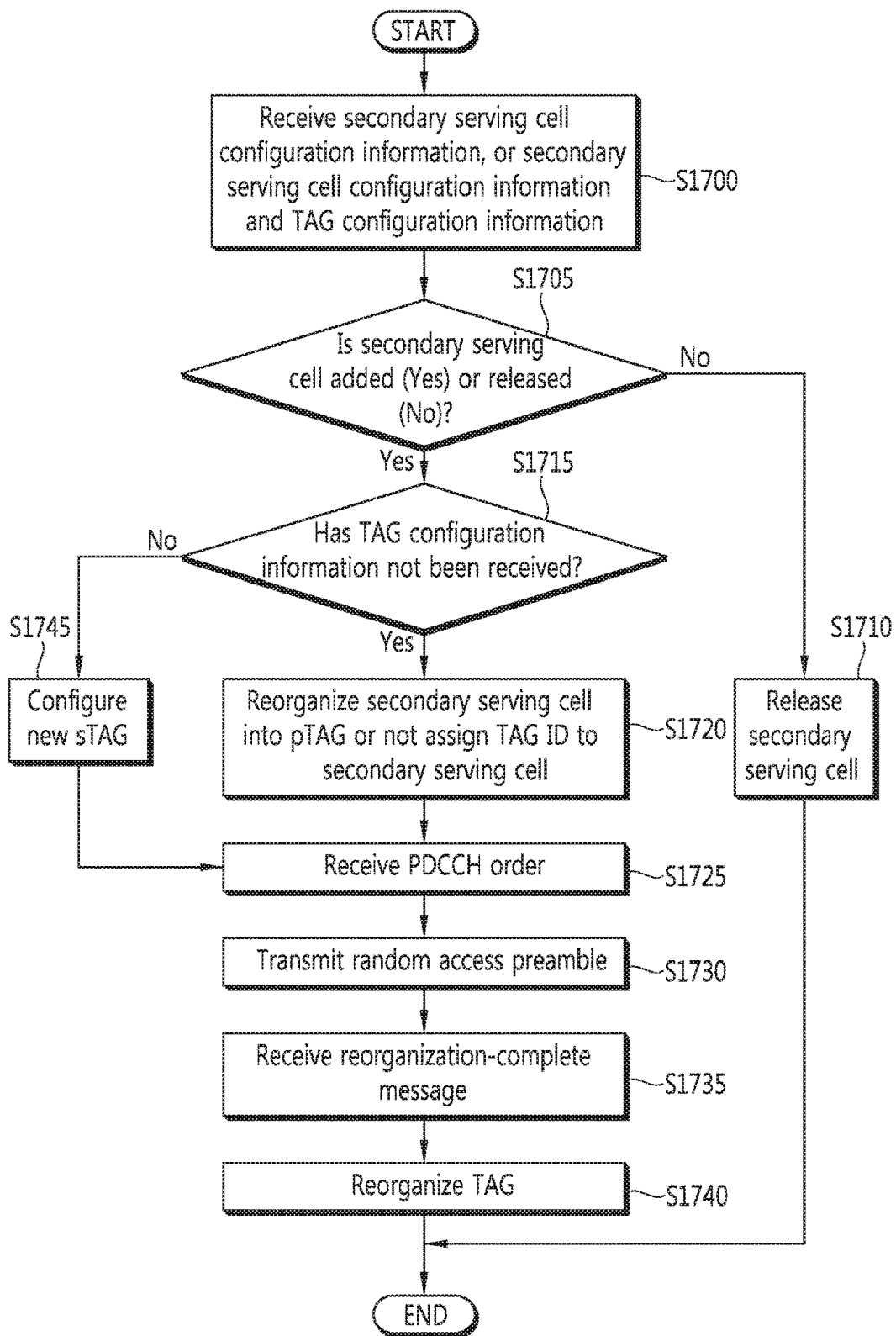
FIG. 14 is a flowchart illustrating a method of UE reorganizing a TAG in accordance with an example of the present invention.

FIG. 14 is a flowchart illustrating a method of UE reorganizing a TAG in accordance with an example of the present invention.

Referring to FIG. 14, UE receives secondary serving cell configuration information or the secondary serving cell configuration information and reorganized TAG configuration information from an eNB at step S1700. The secondary serving cell configuration information and the TAG configuration information may be received through one RRC connection reconfiguration procedure or different RRC connection reconfiguration procedures. In an embodiment, the TAG configuration information may be included in the secondary serving cell configuration information.

The UE checks whether the secondary serving cell configuration information is for adding or releasing a secondary serving cell at step S1705. If the secondary serving cell configuration information includes a field 'sCellToReleaseList', the secondary serving cell configuration information is for releasing the secondary serving cell. In contrast, if the secondary serving cell configuration information includes a field 'sCellToAddModList', the secondary serving cell configuration information is for adding the secondary serving cell.

If the secondary serving cell configuration information is for releasing the secondary serving cell, the UE releases the configuration of the secondary serving cell at step S1710. For example, if the UE receives the secondary serving cell configuration information and the reorganized TAG configuration information through one RRC connection reconfiguration procedure, the UE releases the secondary serving cell. For another example, if the UE receives the secondary serving cell configuration information and the reorganized TAG configuration information through different RRC connection reconfiguration procedures, the UE releases the secondary serving cell and reorganizes a TAG.

If, as a result of the check, the secondary serving cell configuration information is for adding the secondary serving cell, the UE checks whether TAG configuration information has been received or not at step S1715. If the UE has not received the TAG configuration information, it may mean that an eNB has not sent the TAG configuration information or that the TAG configuration information is not included in the secondary serving cell configuration information. As described in Paragraph (2-2-2), it may mean that i) a TAG ID=0, ii) a TAG ID='Null', or iii) TAG configuration information is not included in the secondary serving cell configuration information.

If, as a result of the check at the step S1715, the UE has not received the TAG configuration information, the UE reorganizes the added secondary serving cell into a pTAG by default, assigns the added secondary serving cell to a new sTAG, or does not assign any TAG ID to the added secondary serving cell at step S1720.

The UE receives a PDCCH order from the eNB at step S1725. In response thereto, the UE sends a random access preamble to the eNB at step S1730.

The UE receives a reorganization-complete message from the eNB at step S1735 and reorganizes the TAG in response to the reorganization-complete message at step S1740. The reorganization-complete message may be, for example, at least of an RAR message including a timing advance value, an RRC connection reconfiguration message, and a PDCCH order.

For example, if the reorganization-complete message is the RAR message, the reorganization-complete message may be a MAC RAR or a MAC CE. If a PDCCH scrambled into an RA-RNTI is received, the UE can check a MAC RAR including a timing advance value from a PDSCH indicated by the PDCCH. If a PDCCH scrambled into a C-RNTI is received, the UE can check a MAC CE including a timing advance value from a PDSCH indicated by the PDCCH. Next, the UE performs TAG reorganization. As an example of the TAG reorganization, if the timing advance value has the same timing advance value applied to an existing TAG (a pTAG or an sTAG), the UE maps the added secondary serving cell to a corresponding TAG. As another example of the TAG reorganization, if the timing advance value is different from a timing advance value applied within an existing TAG (a pTAG or an sTAG) and the number of TAGs now configured in the UE is smaller than a maximum number of TAGs that can be configured, the UE designates a temporary TAG ID as the TAG ID of a new sTAG and maps the added secondary serving cell to the TAG. As yet another example of the TAG reorganization, if the timing advance value is different from a timing advance value applied within an existing TAG (a pTAG or an sTAG) and the number of TAGs now configured in the UE is the same as a maximum number of TAGs that can be configured, the UE performs one of the following operation. That is, i) the UE may determine that the timing advance value for the added secondary serving cell is not valid and disregard the received timing advance value. ii) The UE may deactivate the added secondary serving cell in order to prevent uplink transmission within a corresponding TAG. This is because there may be a problem in uplink transmission within the TAG because a new TAG ID and the configuration of a current TAG are not valid. iii) The UE may release the configuration of the added secondary serving cell instead of the deactivation operation.

For another example, if the reorganization-complete message is the RRC connection reconfiguration message, the reorganization-complete message includes reorganized TAG configuration information. The reorganized TAG configuration information indicates a specific TAG ID in addition to a pTAG. In this case, the UE reorganizes the added secondary serving cell into a TAG having the specific TAG ID.

For yet another example, if the reorganization-complete message is the PDCCH order, the reorganization-complete message is an indicator having a meaning that a random access procedure in the added secondary serving cell is stopped. In this case, the UE maintains the added secondary serving cell in a temporally mapped TAG (e.g., a pTAG) and does not reorganize the TAG.

If, as a result of the check at the step S1715, the UE has received the TAG configuration information, the UE checks whether a TAG ID indicated by the TAG configuration information is a temporary TAG ID or a normal TAG ID and configures a temporary TAG or a new sTAG in response to the TAG ID indicated by the TAG configuration information at step S1745. Next, the UE performs the step S1725 to the step S1740.

Figure 15:
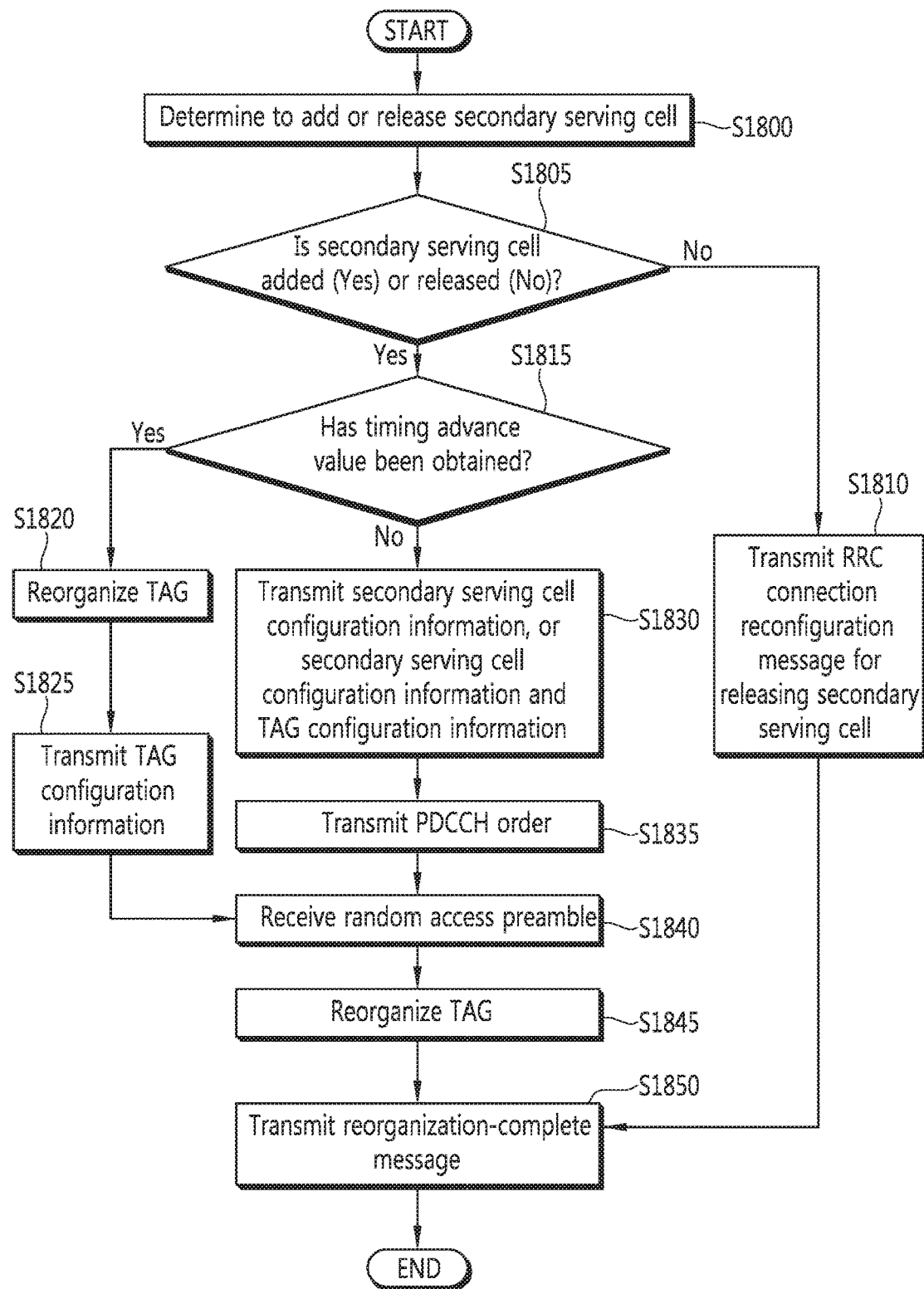
FIG. 15 is a flowchart illustrating a method of a BS reorganizing a TAG in accordance with an example of the present invention.

FIG. 15 is a flowchart illustrating a method of an eNB reorganizing a TAG in accordance with an example of the present invention.

Referring to FIG. 15, an eNB determines to add or release a secondary serving cell at step S1800. For example, if a frequency band necessary for UE is reduced or access to a secondary serving cell of a serving eNB is released due to a handover, the eNB can determine to release a secondary serving cell configured in UE. For another example, if a bandwidth supported for UE is increased or the new cell of a target eNB is accessed due to a handover, the eNB can determine to additionally configure a secondary serving cell in UE. The addition or release of the secondary serving cell corresponds to the change or update of secondary serving cell configuration information.

If a change of secondary serving cell configuration information corresponds to the release of the secondary serving cell at step S1805, the eNB sends an RRC connection reconfiguration message for releasing the secondary serving cell to the UE at step S1810.

In contrast, if a change of secondary serving cell configuration information corresponds to the addition of the secondary serving cell at step S1805, the eNB checks whether a timing advance value for the added secondary serving cell can be obtained at step S1815. If the eNB has obtained the timing advance value for the added secondary serving cell or can obtain the timing advance value for the added secondary serving cell, the eNB reorganizes the added secondary serving cell into a specific TAG at step S1820 and sends TAG configuration information, indicating a TAG ID to be mapped to the added secondary serving cell, to the UE at step S1825. Here, the TAG configuration information may be included in secondary serving cell configuration information and transmitted or may be transmitted separately from secondary serving cell configuration information. In contrast, if a serving cell having a specific frequency band is always provided through an FSR or a remote radio head, the eNB cannot secure a timing advance value because the serving cell having the specific frequency band and a serving cell directly served by the eNB have different timing advance values and belong to different TAGs in relation to all pieces of UE within the service coverage of the eNB.

If, as a result of the check at step S1815, a timing advance value for the added secondary serving cell cannot be obtained, the eNB maps the added secondary serving cell to a temporary TAG ID or sets a TAG ID regarding the added secondary serving cell to 'Null' or does not generate TAG configuration information. Next, the eNB sends the secondary serving cell configuration information for adding the secondary serving cell or the secondary serving cell configuration information and TAG configuration information to the UE at step S1830. The secondary serving cell configuration information and the TAG configuration information may be transmitted through one RRC connection reconfiguration procedure or different RRC connection reconfiguration procedures. In an embodiment, the TAG configuration information may be included in the secondary serving cell configuration information. If a TAG regarding the secondary serving cell is set to 'Null' or a TAG ID=0, it may be considered that the added secondary serving cell is temporally mapped to a pTAG or that the added secondary serving cell is not mapped to any TAG.

The eNB sends a PDCCH order to the UE at step S1835. In response thereto, the eNB receives a random access preamble from the UE on the added secondary serving cell at step S1840.

The eNB obtains a timing advance value for the added secondary serving cell when receiving the random access preamble and reorganizes the added secondary serving cell into a specific TAG based on the timing advance value at step S1845. For example, if the timing advance value is the same as that of a pTAG in the state in which the added secondary serving cell has been reorganized into the pTAG when adding the secondary serving cell, the eNB does not reorganize the TAG. For another example, if the timing advance value is different from that of a pTAG, but is the same as that of another sTAG in the state in which the added secondary serving cell has been reorganized into the pTAG when adding the secondary serving cell, the eNB reorganizes the added secondary serving cell into the sTAG. For yet another example, if the timing advance value is different from that of a pTAG and also different from that of another sTAG in the state in which the added secondary serving cell has been reorganized into the pTAG when adding the secondary serving cell, the eNB reorganizes the added secondary serving cell into a new sTAG.

The eNB sends a reorganization-complete message for informing the UE of the reorganized TAG to at step S1850. The reorganization-complete message can be at least one of, for example, an RAR message including a timing advance value, an RRC connection reconfiguration message, and a PDCCH order.

For example, if the reorganization-complete message is the RAR message, the reorganization-complete message may be a MAC RAR or a MAC CE. If a PDCCH scrambled into an RA-RNTI is received, the UE can check a MAC RAR including a timing advance value from a PDSCH indicated by the PDCCH. If a PDCCH scrambled into a C-RNTI is received, the UE can check a MAC CE including a timing advance value from a PDSCH indicated by the PDCCH. In this case, the UE implicitly reorganizes the added secondary serving cell into any one existing TAG based on the timing advance value.

For another example, if the reorganization-complete message is the RRC connection reconfiguration message, the reorganization-complete message includes reorganized TAG configuration information. The reorganized TAG configuration information indicates a specific TAG ID in addition to a pTAG. In this case, the UE reorganizes the added secondary serving cell into a TAG having the specific TAG ID.

For yet another example, if the reorganization-complete message is the PDCCH order, the reorganization-complete message is an indicator having a meaning that a random access procedure in the added secondary serving cell is stopped. In this case, the UE maintains the added secondary serving cell in a temporally mapped TAG (e.g., a pTAG) and does not reorganize the TAG.

Figure 16:
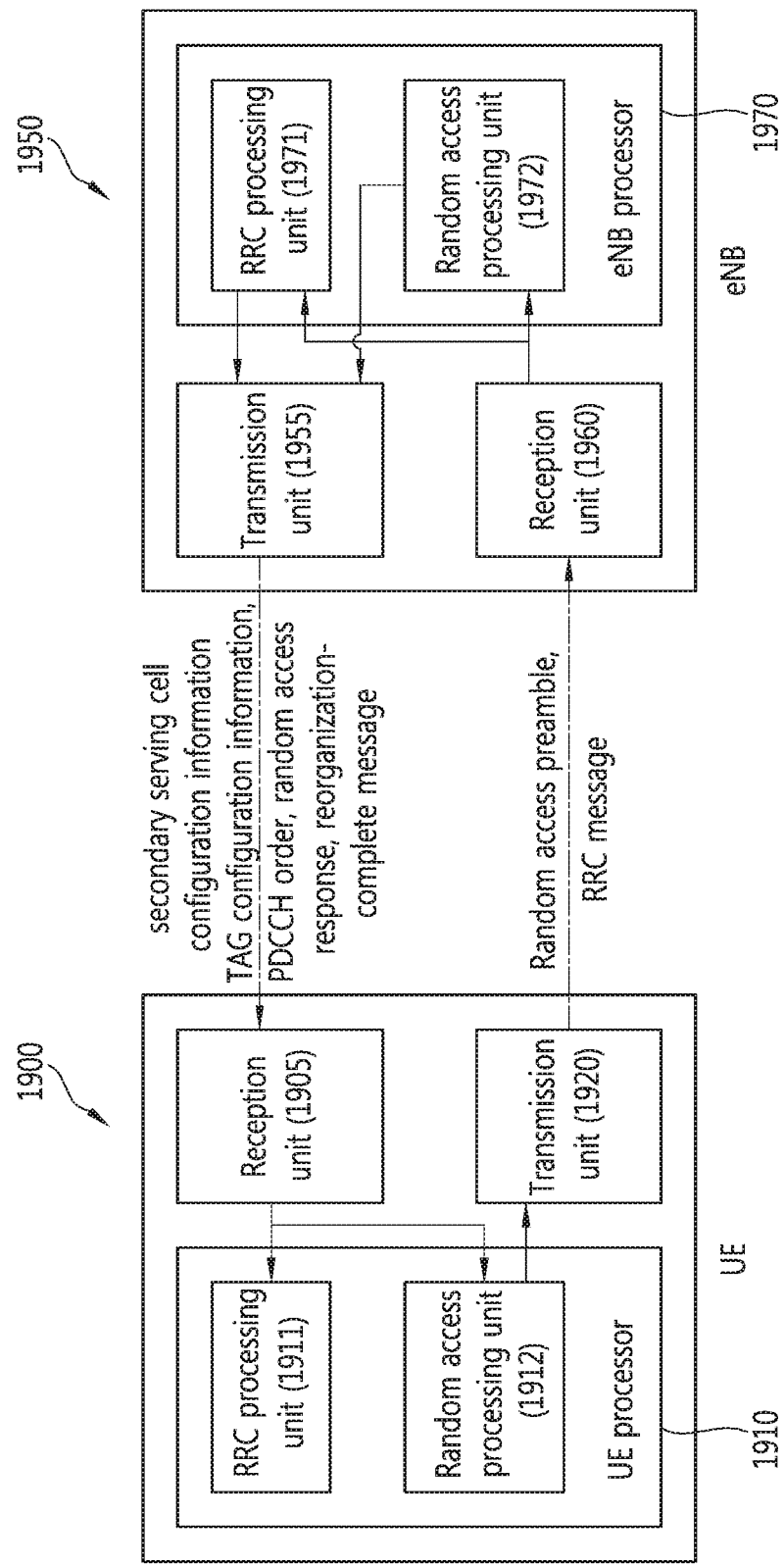
FIG. 16 is a block diagram showing UE and a BS for sending signals regarding uplink synchronization in accordance with an example of the present invention.

FIG. 16 is a block diagram showing UE and an eNB for sending signals regarding uplink synchronization in accordance with an example of the present invention.

Referring to FIG. 16, the UE 1900 includes a reception unit 1905, a UE processor 1910, and a transmission unit 1920. The UE processor 1910 includes an RRC processing unit 1911 and a random access processing unit 1912.

The reception unit 1905 receives secondary serving cell configuration information, TAG configuration information, a PDCCH order, an RAR message, and a reorganization-complete message from an eNB 1950. The reorganization-complete message can be at least one of, for example, an RAR message including a timing advance value, an RRC connection reconfiguration message, and a PDCCH order.

The RRC processing unit 1911 generates a message used in an RRC procedure or receives the message from the eNB 1950. The RRC procedure can include, for example, an RRC connection establishment procedure and an RRC connection reconfiguration procedure. A message used in the RRC connection reconfiguration procedure can include at least one of secondary serving cell configuration information and TAG configuration information.

The RRC processing unit 1911 configures a primary serving cell and at least one secondary serving cell, used in a CA, in the UE 1900 in the form of the CA. A procedure for additionally configuring a secondary serving cell in the UE 1900 or releasing a secondary serving cell configured in the UE 1900 can be indicated by secondary serving cell configuration information.

Meanwhile, the RRC processing unit 1911 reorganizes a TAG based on at least one of secondary serving cell configuration information and a TAG ID indicated by TAG configuration information. The RRC processing unit 1911 reorganizes the TAG so that the secondary serving cell is included in the TAG. For example, if the secondary serving cell configuration information includes an information field for adding or releasing a specific secondary serving cell, the RRC processing unit 1911 adds or releases the specific secondary serving cell based on an order of the information field and updates or reorganizes a TAG to or from which the specific secondary serving cell is added or released.

Furthermore, if the TAG configuration information indicates that a specific secondary serving cell is mapped to a TAG having a specific ID, the RRC processing unit 1911 reorganizes the specific secondary serving cell into the TAG having the specific ID based on the TAG configuration information. If the specific TAG ID=0 or the TAG ID='Null', the RRC processing unit 1911 determines that the specific secondary serving cell belongs to a pTAG by default and reorganizes the specific secondary serving cell into the pTAG. In an embodiment, the RRC processing unit 1911 does not reorganize the specific secondary serving cell into any TAG. If a TAG has a temporary value, that is, a specific TAG ID0, the RRC processing unit 1911 reorganizes the specific secondary serving cell into a temporary TAG ID.

Furthermore, the RRC processing unit 1911 can reorganize the TAG based on the timing advance value regarding the secondary serving cell received from the random access processing unit 1912. As an example of the TAG reorganization, if there is a TAG having the same timing advance value as that of an existing TAG (a pTAG or an sTAG), the RRC processing unit 1911 maps the added secondary serving cell to the corresponding TAG. As another example of the TAG reorganization, if the timing advance value is different from a timing advance value applied within an existing TAG (a pTAG or an sTAG) and the number of TAGs now configured in the UE 1900 is smaller than a maximum number of TAGs that can be configured, the RRC processing unit 1911 designates a temporary TAG ID as the TAG ID of a new sTAG and maps the added secondary serving cell to the TAG. As yet another example of the TAG reorganization, if the timing advance value is different from a timing advance value applied within an existing TAG (a pTAG or an sTAG) and the number of TAGs now configured in the UE 1900 is the same as a maximum number of TAGs that can be configured, the RRC processing unit 1911 performs one of the following operations. That is, i) the RRC processing unit 1911 determines that the timing advance value for the added secondary serving cell is not valid and disregards the received timing advance value. ii) The RRC processing unit 1911 deactivates the added secondary serving cell in order to prevent uplink transmission within a corresponding TAG. This is because there may be a problem in uplink transmission within a TAG because a new TAG ID and the configuration of a current TAG are not valid. iii) The RRC processing unit 1911 may release the added secondary serving cell instead of the deactivation operation.

The random access processing unit 1912 generates a random access preamble in response to a PDCCH order and sends the random access preamble to the transmission unit 1920. Furthermore, the random access processing unit 1912 obtains a timing advance value regarding a secondary serving cell from a Random Access Response (RAR) message received from the reception unit 1905 and controls uplink synchronization regarding the secondary serving cell based on the timing advance value. Furthermore, the random access processing unit 1912 can provide the timing advance value to the RRC processing unit 1911 so that the RRC processing unit 1911 reorganizes a TAG.

The transmission unit 1920 sends the random access preamble or an RRC message to the eNB 1950.

The eNB 1950 includes a transmission unit 1955, a reception unit 1960, and an eNB processor 1970. The eNB processor 1970 includes an RRC processing unit 1971 and a random access processing unit 1972.

The transmission unit 1955 sends secondary serving cell configuration information, TAG configuration information, a PDCCH order, and an RAR to the UE 1900. Here, the transmission unit 1955 may send the secondary serving cell configuration information including the TAG configuration information or may send the TAG configuration information separately from the secondary serving cell configuration information.

The reception unit 1960 receives a random access preamble and an RRC message from the UE 1900.

The RRC processing unit 1971 determines to add or release a secondary serving cell for the UE 1900. For example, if a frequency band necessary for the UE 1900 is reduced or access to the secondary serving cell of a serving eNB is released due to a handover, the RRC processing unit 1971 can determine to release a secondary serving cell configured in the UE 1900. For another example, if a bandwidth supported for the UE 1900 is increased or the new cell of a target eNB is accessed due to a handover, the RRC processing unit 1971 can determine to additionally configure a secondary serving cell in the UE 1900. The addition or release of the secondary serving cell corresponds to the change or update of secondary serving cell configuration information.

If a change of the secondary serving cell configuration information corresponds to the release of the secondary serving cell, the RRC processing unit 1971 generates an RRC connection reconfiguration message for releasing the secondary serving cell and sends the RRC connection reconfiguration message to the transmission unit 1955.

In contrast, if a change of the secondary serving cell configuration information corresponds to the addition of the secondary serving cell, the RRC processing unit 1971 checks whether the timing advance value of the secondary serving cell can be obtained. If, as a result of the check, the RRC processing unit 1971 has secured the timing advance value of the secondary serving cell or can secure the timing advance value of the secondary serving cell, the RRC processing unit 1971 reorganizes the secondary serving cell into a specific TAG, generates TAG configuration information indicative of a TAG ID to which the secondary serving cell will be mapped, sends the TAG configuration information to the transmission unit 1955. Here, the TAG configuration information may be included in secondary serving cell configuration information or may be generated separately from secondary serving cell configuration information.

If, as a result of the check, the RRC processing unit 1971 is unable to secure the timing advance value of the secondary serving cell, the RRC processing unit 1971 maps the secondary serving cell to a temporary TAG ID, sets a TAG ID regarding the added secondary serving cell to 'Null', or does not generate TAG configuration information. Furthermore, the RRC processing unit 1971 generates secondary serving cell configuration information for adding the secondary serving cell or the secondary serving cell configuration information and TAG configuration information and sends the secondary serving cell configuration information for adding the secondary serving cell or the secondary serving cell configuration information and the TAG configuration information to the transmission unit 1955.

The RRC processing unit 1971 may include the secondary serving cell configuration information and the TAG configuration information in one RRC connection reconfiguration message or in different RRC connection reconfiguration messages. In an embodiment, the RRC processing unit 1971 may include the TAG configuration information in the secondary serving cell configuration information. If a TAG ID regarding the secondary serving cell is 'Null' or the TAG ID=0, it may be considered that the added secondary serving cell is temporally mapped to a pTAG or that the added secondary serving cell is not mapped to any TAG.

The random access processing unit 1972 generates a PDCCH order in order to obtain a timing advance value for the uplink synchronization of the added secondary serving cell and sends the PDCCH order to the transmission unit 1955. As a response thereto, the reception unit 1960 receives a random access preamble from the UE 1900 on the secondary serving cell.

The random access processing unit 1972 obtains a timing advance value for the added secondary serving cell when receiving the random access preamble, and the RRC processing unit 1971 reorganizes the added secondary serving cell into a specific TAG based on the timing advance value. For example, if the timing advance value is the same as that of a pTAG in the state in which an added secondary serving cell has been reorganize into the pTAG when adding the secondary serving cell, the RRC processing unit 1971 does not reorganize a TAG. For another example, if the timing advance value is different from that of a pTAG and is the same as another sTAG in the state in which an added secondary serving cell has been reorganize into the pTAG when adding the secondary serving cell, the RRC processing unit 1971 reorganizes the added secondary serving cell into the sTAG. For yet another example, if the timing advance value is different from that of a pTAG and is different from another sTAG in the state in which an added secondary serving cell has been reorganize into the pTAG when adding the secondary serving cell, the RRC processing unit 1971 reorganizes the added secondary serving cell into a new sTAG.

The RRC processing unit 1971 or the random access processing unit 1972 generates a reorganization-complete message for informing the UE 1900 of the reorganized TAG and sends the reorganization-complete message to the transmission unit 1955. The reorganization-complete message can be at least one of, for example, an RAR message including a timing advance value, an RRC connection reconfiguration message, and a PDCCH order.

For example, if the reorganization-complete message is the RAR message, the reorganization-complete message can be a MAC RAR or a MAC CE. If a PDCCH scrambled into an RA-RNTI is received, the random access processing unit 1972 can check a MAC RAR including a timing advance value from a PDSCH indicated by a PDCCH. If a PDCCH scrambled into a C-RNTI is received, the random access processing unit 1972 can check a MAC CE including a timing advance value from a PDSCH indicated by a PDCCH. In this case, the RRC processing unit 1971 implicitly reorganizes the added secondary serving cell into any one existing TAG based on the timing advance value.

For another example, if the reorganization-complete message is the RRC connection reconfiguration message, the reorganization-complete message includes reorganized TAG configuration information. The reorganized TAG configuration information indicates a specific TAG ID other than a pTAG. In this case, the RRC processing unit 1971 reorganizes the added secondary serving cell into a TAG having the specific TAG ID.

For yet another example, if the reorganization-complete message is the PDCCH order, the reorganization-complete message is an indicator having a meaning that a random access procedure in the added secondary serving cell is stopped. In this case, the RRC processing unit 1971 maintains the added secondary serving cell in a temporally mapped TAG (e.g., a pTAG) and does not reorganize a corresponding TAG.

In accordance with the present invention, a procedure can be simplified and TAG reorganization can be performed more rapidly because TAG configuration information for reorganizing a TAG does not need to be separately transmitted. Furthermore, an eNB may explicitly order TAG reorganization for UE or UE can implicitly perform TAG reorganization.

While some exemplary embodiments of the present invention have been described with reference to the accompanying drawings, those skilled in the art may change and modify the present invention in various ways without departing from the essential characteristic of the present invention. Accordingly, the disclosed embodiments should not be construed as limiting the technical spirit of the present invention, but should be construed as illustrating the technical spirit of the present invention. The scope of the technical spirit of the present invention is not restricted by the embodiments, and the scope of the present invention should be interpreted based on the following appended claims. Accordingly, the present invention should be construed as covering all modifications or variations derived from the meaning and scope of the appended claims and their equivalents.

What is claimed is:

1. A method of a user equipment (UE) for re-organizing a timing advance group (TAG) that is a group of serving cells with an uplink configured that use the same timing reference cell and the same timing advance value, the method comprising:
- receiving, from a serving base station, secondary serving cell (SCell) configuration information which includes a first field and a second field, the first field including a first ScellIndex of an SCell to indicate a removal of the SCell, the second field including at least one of second Scellindex to indicate an addition of one or more SCell and a TAG identifier (ID) indicating the TAG of the one or more SCell;
- removing the SCell associated with the first Scellindex from available SCells configured in the UE;
- adding the one or more SCell indicated by the second Scellindex to another available SCells configured in the UE; and
- reorganizing the one or more SCell with the another available SCells associated with same TAG identifier.

2. The method of claim 1, wherein if the second field includes no TAG ID, the TAG includes a primary serving cell (PCell).

3. The method of claim 1, wherein the SCell configuration information is received through an RRC connection reconfiguration message.

4. The method of claim 1, wherein the SCell configuration information is received when the UE performs a handover from a serving base station to a target base station.

5. A user equipment (UE) of re-organizing a timing advance group (TAG) that is a group of serving cells with an uplink configured that use the same timing reference cell and the same timing advance value, the UE comprising:
- a receiving unit for receiving, from a serving base station, secondary serving cell (SCell) configuration information which includes a first field and a second field, the first field including a first ScellIndex of an SCell to indicate a removal of the SCell, the second field including at least one of second ScellIndex to indicate an addition of one or more SCell and a TAG identifier (ID) indicating the TAG of the one or more SCell; and
- a radio resource control (RRC) processing unit for removing the SCell associated with the first Scellindex from available SCells configured in the UE, adding the one or more SCell indicated by the second Scellindex to another available SCells configured in the UE, and reorganizing the one or more SCell with the another available SCells associated with same TAG identifier.

6. The UE of claim 5, wherein if the receiving unit receives the second field with no TAG ID, the TAG includes a primary serving cell (PCell).

7. The UE of claim 5, wherein the receiving unit receives the SCell configuration information through an RRC connection reconfiguration message.

8. The UE of claim 5, wherein the receiving unit receives the SCell configuration information when the UE performs a handover from the serving base station to a target base station.

9. A method of a base station (BS) for re-organizing a timing advance group (TAG) that is a group of serving cells with an uplink configured that use the same timing reference cell and the same timing advance value, the method comprising:
- generating secondary serving cell (SCell) configuration information which includes a first field and a second field, the first field including a first ScellIndex of an SCell to indicate a removal of the SCell from available SCells configured in the UE, the second field including at least one of second ScellIndex to indicate an addition of one or more SCell and a TAG identifier (ID) indicating the TAG of the one or more SCell to another available SCells configured in the UE; and
- transmitting the one or more SCell configuration information to reorganize the one or more SCell with the another available SCells associated with same TAG identifier.

10. The method of claim 9, wherein if the second field includes no TAG ID, the TAG includes a primary serving cell (PCell).

11. The method of claim 9, wherein the SCell configuration information is included in an RRC connection reconfiguration message.

12. The method of claim 9, wherein the SCell configuration information is generated when the UE performs a handover from the BS to a target base station.

13. A base station (BS) of re-organizing a timing advance group (TAG) that is a group of serving cells with an uplink configured that use the same timing reference cell and the same timing advance value, the BS comprising:
- a radio resource control (RRC) processing unit for generating secondary serving cell
- (SCell) configuration information which includes a first field and a second field, the first field including a first ScellIndex of an SCell to indicate a removal of the SCell from available SCells configured in the UE, the second field including at least one of second ScellIndex to indicate an addition of one or more SCell and a TAG identifier (ID) indicating the TAG of the one or more SCell to another available SCells configured in the UE; and
- a transmitting unit for transmitting the one or more SCell configuration information to reorganize the one or more SCell with the another available SCells associated with same TAG identifier.

14. The BS of claim 13, wherein if the RRC processing unit generates the second field with no TAG ID, the TAG includes a primary serving cell (PCell).

15. The BS of claim 13, wherein the SCell configuration information is included in an RRC connection reconfiguration message.

16. The BS of claim 13, wherein the RRC processing unit generates the SCell configuration information when the UE performs a handover from the BS to a target base station.

* * * * *